United States Patent
Zadeh et al.

(10) Patent No.: US 10,172,017 B2
(45) Date of Patent: Jan. 1, 2019

(54) METHOD AND APPARATUS FOR ASSIGNING CELL IDENTIFIER VALUES AND METHOD AND APPARATUS FOR MANAGING ASSIGNMENT OF CELL IDENTIFIER VALUES IN A COMMUNICATION NETWORK

(71) Applicant: Telefonaktiebolaget LM Ericsson (publ), Stockholm (SE)

(72) Inventors: Bagher Zadeh, Stockholm (SE); Cormac Mullally, Athlone (IE); David Quinlan, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/908,532

(22) PCT Filed: Jul. 31, 2013

(86) PCT No.: PCT/EP2013/066080
§ 371 (c)(1),
(2) Date: Jan. 28, 2016

(87) PCT Pub. No.: WO2015/014397
PCT Pub. Date: Feb. 5, 2015

(65) Prior Publication Data
US 2016/0192204 A1 Jun. 30, 2016

(51) Int. Cl.
*H04W 40/00* (2009.01)
*H04W 16/22* (2009.01)
(Continued)

(52) U.S. Cl.
CPC ......... *H04W 16/22* (2013.01); *H04L 41/0893* (2013.01); *H04W 24/02* (2013.01); *H04W 88/08* (2013.01)

(58) Field of Classification Search
CPC ...... H04W 16/18; H04W 16/24; H04W 24/00
(Continued)

(56) References Cited

U.S. PATENT DOCUMENTS

| | | | |
|---|---|---|---|
| 2010/0222075 A1* | 9/2010 | Miura | G01S 5/0252 455/456.1 |
| 2011/0086652 A1 | 4/2011 | So et al. | |

(Continued)

FOREIGN PATENT DOCUMENTS

CN 1535543 A 10/2004
WO 2012110078 A1 8/2012

OTHER PUBLICATIONS

3GPP TS 32.101 V10.1.0 (Jun. 2013), 3rd Generation Partnership Project; Technical Specification Group Services and System Aspects; Telecommunication management; Principles and high level requirements (Release 10), 65 pages.

(Continued)

*Primary Examiner* — Nghi H Ly
(74) *Attorney, Agent, or Firm* — Sage Patent Group

(57) ABSTRACT

The present invention relates to a method and apparatus for automatically assigning cell identifier values in a communication network and to a method and apparatus for managing the assignment of cell identifier values in a communication network. In particular, the present invention relates to the management and assignment of cell identifier values that are required to be unique between adjacent cells, in a border region within a communication network in which cells from two or more cell sets are present. The present invention provides a novel method and apparatus for assigning cell identifier values in a communication network and for managing the assignment of cell identifier values in a communication network. Embodiments of the invention enable the automatic assignment of cell identifiers in a communication network, such as the assignment of physical cell identities (PCI) and scrambling codes (SC) in a Long Term Evolution (LTE) network. The need for manual admin-
(Continued)

istration in border areas between cell sets managed by different Operation Support Systems (OSSs) can therefore be reduced or eliminated.

16 Claims, 13 Drawing Sheets

(51) Int. Cl.
*H04W 24/02* (2009.01)
*H04L 12/24* (2006.01)
*H04W 88/08* (2009.01)

(58) Field of Classification Search
USPC .................. 455/446, 422.1, 414.1, 561, 418
See application file for complete search history.

(56) References Cited

U.S. PATENT DOCUMENTS

2013/0172031 A1* 7/2013 Calippe .................. H04W 8/26
                                                                455/509
2013/0316710 A1* 11/2013 Maaref ................. H04W 16/10
                                                                455/436

OTHER PUBLICATIONS

PCT International Search Report, dated Apr. 17, 2014, in connection with International Application No. PCT/EP2013/066080, all pages.

Nokia Siemens Networks et al., Solution(s) to the 36.902's Automated Configuration of Physical Cell Identity Use Case, 3GPP TSG-RAN WG3 Meeting #59-bis, Shenzen, China, Mar. 31-Apr. 3, 2008, 7 pages.

3GPP TS 32.500, V 11.1.0 (Dec. 2011), 3rd Generation Partnership Project; Technical Specification Group Services and System Aspects; Telecommunication Management; Self-Organizing Networks (SON); Concepts and requirements (Release 11), 13 pages.

Office Action and Search Report for CN Application No. 201380080007. 2, dated Jun. 20, 2018, 7 pages.

* cited by examiner

METHOD AND APPARATUS FOR ASSIGNING CELL IDENTIFIER VALUES AND METHOD AND APPARATUS FOR MANAGING ASSIGNMENT OF CELL IDENTIFIER VALUES IN A COMMUNICATION NETWORK

TECHNICAL FIELD

The present invention relates to a method and apparatus for automatically assigning cell identifier values in a communication network and to a method and apparatus for managing the assignment of cell identifier values in a communication network. In particular, the present invention relates to the management and assignment of cell identifier values that are required to be unique between adjacent cells, in a border region within a communication network in which cells from two or more cell sets are present.

BACKGROUND

In modern cellular communication networks, such as the Long Term Evolution (LTE) networks, an Operation Support System (OSS) is provided for managing many aspects of the operation of the cells of the network. Typically, a network operator may select network equipment from more than one vendor, and it is therefore common for a cellular communication network to have two or more Operation Support Systems (OSS), each with a set of cells that are being managed by the respective Operation Support System (OSS).

Some features of the cells in a cellular communication network must be managed on a network-wide basis, and not just managed within each of the Operation Support System. One such feature is a cell identifier for cells in the communication network, since each cell must have a cell identifier that is unique compared with the cell identifiers of neighbouring cells belonging to any cell set. In modern communication networks, the number of physical cell identities (PCI) and scrambling codes (SC) available are limited, for example there are only 504 physical cell identities (PCI) available in a LTE network. These cell identities must be reused within the communication network cells in an optimal way.

In current communication systems the management of features such as cell identities in cellular communication networks with multiple operation support systems (OSS) and respective cell sets is generally handled by allocating reserved ranges to each Operation Support system for use in the cells in the communication network. For example, the network operator may reserve range X of physical cell identities (PCI)s for use in cells managed by OSSs C or D and these physical cell identities (PCI)s will not be used in cells managed by OSS A. Equally the network operator may reserve range Y of physical cell identities (PCI)s for use in cells managed by OSS A and G these physical cell identities (PCI)s will not be used in cells managed by OSS B.

Typically physical cell identities (PCI) and scrambling codes (SC) planning is carried out before cells and base stations are added to the wireless network.

Increasingly operational management of a communication network is being delegated to self organising network (SON) functions, typically operating in an Operation Support System node of the communication network. The use of such SON functions to manage aspects of the operation of the network assists the network operator in managing and operating the network.

The present invention seeks to mitigate or obviate at least some of the disadvantages of the prior art, and to provide a novel method and apparatus for assigning cell identifier values in a communication network and for managing the assignment of cell identifier values in a communication network.

Embodiments of the invention enable the automatic assignment of cell identifiers in a communication network in a border area between cell sets. Embodiments of the invention can be used to assign physical cell identities (PCI) in a Long Term Evolution (LTE) network. The need for manual administration in border areas between cell sets managed by different Operation Support Systems (OSS) can therefore be reduced or eliminated.

SUMMARY

In accordance with one aspect of the invention there is provided a method of assigning cell identifier values for cells of a cell set within a border area in a communication network, where the communication network has at least two managed cell sets and the border area contains cells from at least two cell sets. The method has a first step of, for cell sets in the border area, receiving a set of cell identifier values that are available for cells within the border area and that do not conflict with other cells in the cell set. The method has a second step of, for each cell set, selecting suitable cell identifier values that are common to the respective sets of available cell identifier values for cell sets in the border area. The method has a third step of assigning a set of selected cell identifier values to the respective cell set by informing a respective cell identifier manager of the cell set of the selected cell identifier values.

In some embodiments the method also includes the step of establishing for each cell set a required number of cell identifier values needed for cells of that cell set in the border area.

In some embodiments the step of selecting suitable cell identifier values for a cell set also includes the step of selecting at least the required number of suitable cell identifier values needed for cells of that cell set in the border area.

In some embodiments the step of selecting suitable cell identifier values comprises the step of selecting cell identifier values that are common to the respective sets of available cell identifier values for the other cell sets in the border area.

In some embodiments wherein in the step of selecting, the cell identifier values that align best with existing cell identifier values in the cell set are selected as suitable cell identifier values.

In some embodiments the method also comprises the step of sending to the respective cell identifier manager for each cell set in the border area a request for cell identifier values that are available for cells within the border area.

In some embodiments the method also comprises the step of receiving, in respect of a cell set having newly assigned cell identifier values, an updated set of cell identifier values that are available for cells within the border area for use in the step of selecting suitable cell identifier values for other cell sets in the border area.

In some embodiments the method also comprises the step of analysing a geographical model of the communication network to identify at least one border area between cell sets in the communication network.

In some embodiments the method also comprises the step of creating a geographic model of the communication network by: obtaining information from each cell set in the communication network relating to cell position and cell neighbour information; and creating a model of communication network by combining information about cell sets.

In some embodiments the method also comprises the steps of: updating the geographic model of the communication network; analysing the updated geographic model to identify border areas in the updated model; and assigning cell identifier values for cells of a cell set within at least one border area identified in the in the updated model.

In some embodiments the method also comprises the step of: determining whether one or more cell identifier values already evaluated as being suitable for cells in a cell set are available for use by new cells of the cell set in the updated network model; and, in response to a positive determination, assigning a suitable call identifier values to new cells of the cell set.

In a second aspect of the invention there is provided a machine-readable medium storing instructions thereon which cause a processor to perform the claimed method.

In accordance with a third aspect of the invention, there is provided an apparatus element for assigning cell identifier values for cells of a cell set within a border area in a communication network, where the communication network has at least two managed cell sets and the border area contains cells from at least two cell sets. The apparatus element comprises a processor and a memory, said memory containing instructions executable by said processor. The apparatus element is operative in a first step, for cell sets in the border area, to receive a set of cell identifier values that are available for cells within the border area and that do not conflict with other cells in the cell set. In a second step the apparatus element is operative for each cell set, to select as suitable cell identifier values, cell identifier values that are common to the respective sets of available cell identifier values for cell sets in the border area. In a third step the apparatus element is operative to assign a set of selected cell identifier values to the respective cell set by informing a respective cell identifier manager of the cell set of the selected cell identifier values.

In some embodiments of the cell identifier assignment apparatus, said memory contains instructions executable by said processor whereby said apparatus element is operative to establish, for each cell, set a required number of cell identifier values needed for cells of that cell set in the border area.

In some embodiments said memory contains instructions executable by said processor whereby said apparatus element is operative to create a geographic model of the communication network. In a first step the apparatus element obtains information from each cell set in the communication network relating to cell position and cell neighbour information. In a second step the apparatus element creates a model of communication network by combining information about cell sets.

In some embodiments said memory contains instructions executable by said processor whereby said apparatus element is operative to update a geographic model of the communication network. In a first step the apparatus element analyses the updated geographic model to identify border areas in the updated model. In a second step the apparatus element assigns cell identifier values for cells of a cell set within at least one border area identified in the updated model.

In accordance with a fourth aspect of the invention there is provided a method of managing assignment of cell identifier values for cells in a cell set within a border area of a communication network, where the communication network has at least two managed cell sets and the border area contains cells from at least two cell sets. In a first step cell identifier values that are available for cells within the border area and that do not conflict with other cells in the cell set are identified. In a second step a set of cell identifier values that are available for cells within the border area and that do not conflict with other cells in the cell set are sent to a cell identifier assigner. In a third step, a set of cell identifier values assigned for cells of the cell set in the border area are received from the cell identifier assigner. In a fourth step a cell identifier value from the set of assigned cell identifier values is assigned to a cell in the border area.

In some embodiments the method also comprises the step of receiving a request for cell identifier values that are available for cells within the border area and that do not conflict with other cells in the cell set, wherein at least the step of sending, to a cell identifier assigner, a set of cell identifier values that are available for cells within the border area and that do not conflict with other cells in the cell set, is carried out in response to the step of receiving the request for available cell identifier values.

In some embodiments the method also comprises the steps, after the step of assigning cell identifier values to cells in the cell set, of: identifying cell identifier values that are available for cells within the border area and that do not conflict with other cells in the cell set taking into account the newly assigned cell identifier values; and sending an updated set of newly identified available cell identifier values to the cell identifier assigner.

In some embodiments the method also comprises the steps of: determining whether one or more cell identifier values already evaluated as being suitable for cells in a cell set are available for use by new cells of the cell set in the updated network model; and, in response to a positive determination, assigning a suitable call identifier values to new cells of the cell set.

In accordance with a fifth aspect of the invention there is provided a machine-readable medium having instructions stored thereon which cause a processor to perform a method of managing assignment of cell identifier values for cells in a cell set within a border area of a communication network, where the communication network has at least two managed cell sets and the border area contains cells from at least two cell sets in accordance with embodiments of the invention.

In accordance with a sixth aspect of the invention there is provided an apparatus element for managing cell identifier values for cells in a cell set within a border area of a communication network, where the communication network has at least two managed cell sets and the border area contains cells from at least two cell sets. The apparatus element comprises a processor and a memory, said memory containing instructions executable by said processor. The apparatus element is operative in a first step to identify cell identifier values that are available for cells within the border area and that do not conflict with other cells in the cell set. In a second step the apparatus element is operative to send, to a cell identifier assigner, a set of available cell identifier values that are available for cells within the border area and that do not conflict with other cells in the cell set. In a third step the apparatus element is operative to receive, from the cell identifier assigner, a set of cell identifier values assigned for cells of the cell set in the border area. In a fourth step the apparatus element is operative to assign a cell identifier value from the set of assigned cell identifier values to a cell in the border area.

In some embodiments of the apparatus element said memory contains instructions executable by said processor whereby said apparatus element is operative in a first step to determine whether one or more cell identifier values already evaluated as being suitable for cells in a cell set are available for use by a new cell of the cell set. In response to a positive determination, in a second step the apparatus element assigns a suitable call identifier value to a new cell of the cell set.

In accordance with another aspect of the invention there is provided an Operation Support System having a cell identifier assignment apparatus in accordance with the invention and a cell identifier assignment management apparatus in accordance with the invention.

BRIEF DESCRIPTION OF THE DRAWINGS

The invention will now be described by way of example with reference to the accompanying drawings, in which.

DETAILED DESCRIPTION

Embodiments of the present invention will now be described with reference to the accompanying drawings.

Figure 1:
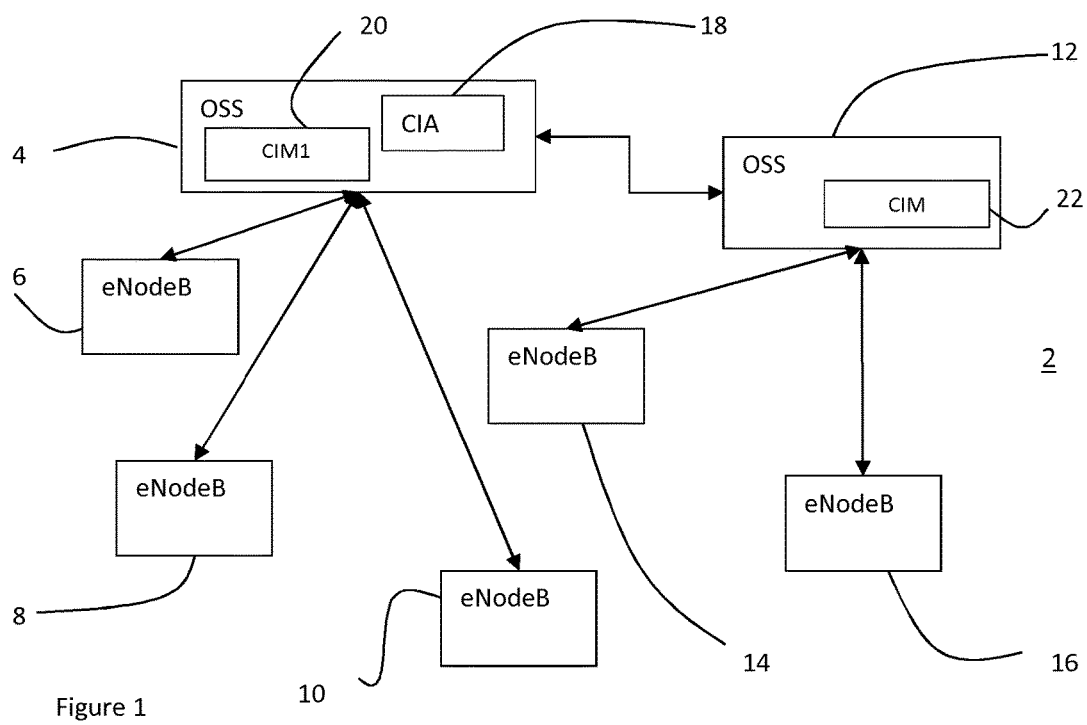
FIG. 1 is a schematic diagram of part of an exemplary communication network in which embodiments of the invention may be implemented.

FIG. 1 is a schematic diagram of part of an exemplary communication network 2 in which embodiments of the invention may be implemented. The exemplary embodiment will be described with reference to the assignment of physical cell identities (PCI) in a LTE communication network, but it will be understood that the invention may be used for the assignment of different cell identifiers, such as scrambling codes (SC), in other communication networks.

The exemplary communication network 2 has a first operation support system (OSS) 4, arranged to manage a plurality of cells forming a respective first cell set. The cells of the first cell set are provided in the LTE communication network of the exemplary embodiment by the plurality of eNodeB 6, 8, 10, as will be understood by a skilled person. The first Operation Support System (OSS) 4 is operatively coupled to the eNodeBs 6, 8, 10 of the first cell set, in order to manage aspects of the operation of the eNode Bs 6, 8, 10 as will be understood by a skilled person. In particular the first operation support system (OSS) 4 assigns cell identifiers from a set of cell identifiers assigned to the first cell set to individual cells in the first cell set. In the exemplary LTE communication network, the cell identifiers may be physical cell identities (PCI) for use by the respective eNodeBs 6, 8, 10.

The exemplary communication network 2 has a second operation support system (OSS) 12, arranged to manage a plurality of cells forming a respective second cell set. The cells of the second cell set are provided in the LTE communication network of the exemplary embodiment by the plurality of eNodeB 14, 16, as will be understood by a skilled person. The second Operation Support System (OSS) 12 is operatively coupled to the eNodeBs 14, 16 of the second cell set, in order to manage aspects of the operation of the eNode Bs 14, 16, as will be understood by a skilled person. In particular the second operation support system (OSS) 12 assigns cell identifiers from a set of cell identifiers assigned to the second cell set to individual cells in the second cell set. In the exemplary LTE communication network, the cell identifiers may be physical cell identities (PCI) for use by the respective eNodeBs 14, 16.

As will be apparent to a skilled person, in an actual communication system, there may be a number of different operation support systems, each with a corresponding cell set of cells being managed by the respective operation support system. Border areas containing cells belonging to separately managed cell sets will be created where cells in different cell sets are adjacent. The assignment of cell identifiers to cells in the border area cannot be handled by any of the operation support systems individually, since information relating to neighbouring cells in other cell sets must be taken into account.

A cell identifier assigner (CIA) 18 is provided in the communication network 2 to assign cell identifier values for cells of a cell set within a border area in a communication network in accordance with one aspect of the invention, as will become clear from the following description. In the exemplary communication system 2 shown in FIG. 1, the cell identifier assigner (CIA) 18 is shown as being located in the first operation support system 4: however, the cell identifier assigner (CIA) 18 may be implemented in any suitable network element, or may be implemented as a stand-alone network element in different implementations, as will be apparent to a skilled person.

The first and second operation support systems 4, 12 are each provided with a respective cell identifier manager (CIM) 20, 22 to managing assignment of cell identifier values for cells in a cell set within a border area of a communication network in accordance with another aspect of the invention, as will become clear from the following description. Again, it is expected that the cell identifier manager (CIM) 20, 22 will be located within the respective operation support system (OSS) 4, 12, but in other embodiments the cell identifier manager (CIM) 20, 22 may be implemented in any network element.

Figure 2:
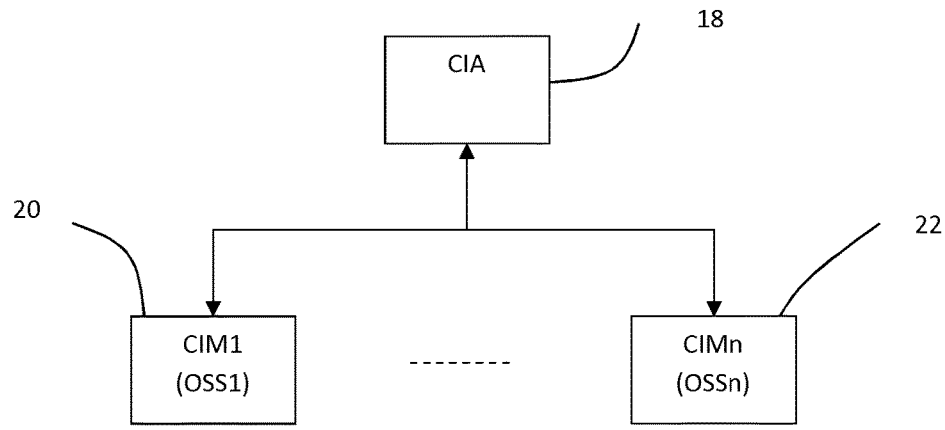
FIG. 2 is a schematic diagram showing the connections between network elements involved in the implementation of embodiments of the present invention.

FIG. 2 is a schematic diagram showing the connections between network elements involved in the implementation of embodiments of the present invention.

The communication network 2 is provided with a cell identifier assigner (CIA) 18 and a plurality n of cell identifier managers (CIM), one cell identifier manager (CIM) for each of the separately managed cell sets, and therefore corresponding to each operation support system, present in the communication network 2. The cell identifier assigner (CIA) 18 is coupled to send information to and to receive information from the cell identifier managers (CIM), as will be explained in the following description. Cell identifier manager 20 shown in FIG. 2 corresponds to a first cell set managed by a first operation support system OSS1 (not shown) while cell identifier manager 22 shown in FIG. 2 corresponds to an nth cell set managed by an nth operation support system OSSn (not shown). The remaining n−2 cell identifier managers in the communication network are represented by the dashed lines between cell identifier manager 20 and cell identifier manager 22.

Figure 3:
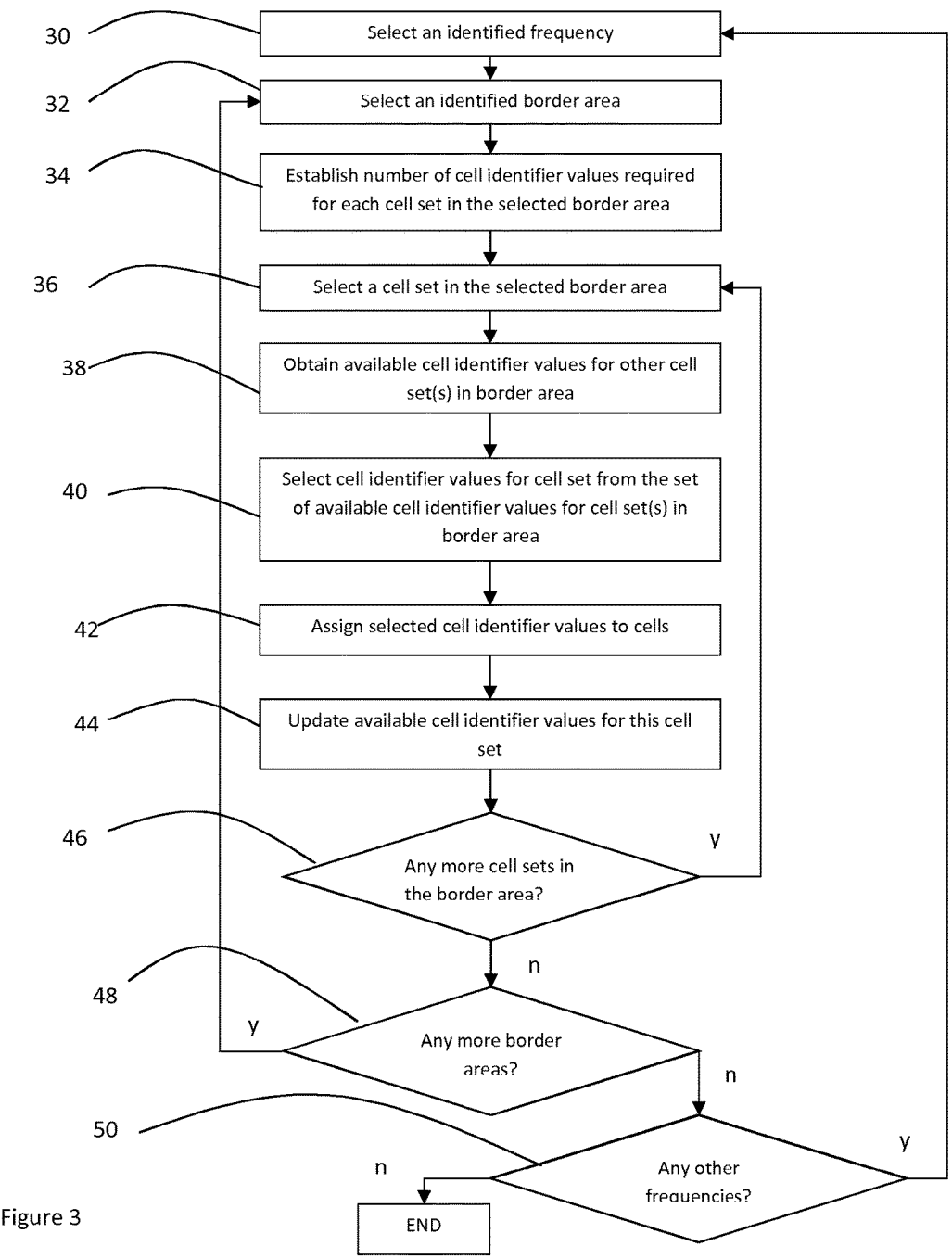
FIG. 3 is a flow chart showing a method of an embodiment of the present invention.
Figure 4:
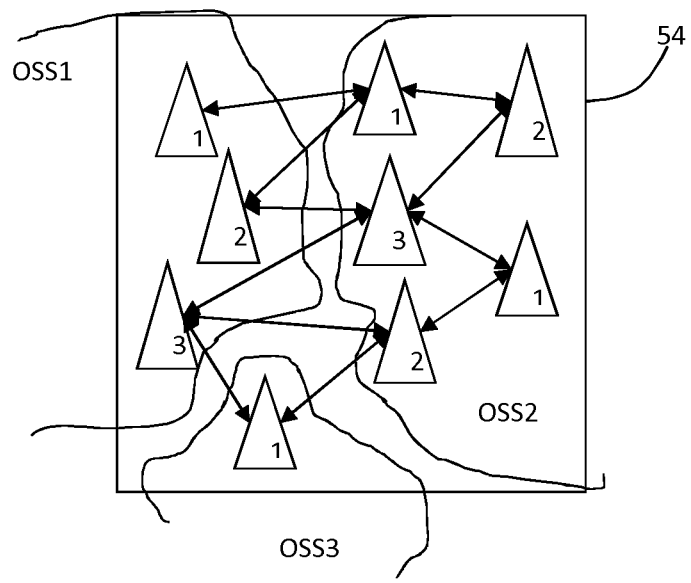
FIGS. 4-7 are schematic diagrams of part of a communication network illustrating the allocation of cell identifiers in accordance with embodiments of the invention.

FIG. 3 is a flow chart showing steps in method of an embodiment of the present invention.

The method shown in FIG. 3 pre-supposes that a border area, containing cells from at least two separately managed cell sets, has been identified within the communication network. Methods for identifying a border area in a communication network will be described later on in this description.

It should be noted that cell identifiers may be used simultaneously in an adjacent cells using different frequencies, and that a long border between cell sets may be divided up into a number of smaller border areas for the purposes of implementing the invention in a particular network arrangement. Therefore methods in accordance with embodiments of the invention may be applied iteratively to different frequencies and to different identified border areas within a communication network, in order to assign cell identifier values within border areas within a communication network.

In step 30, the frequency for which the border areas are to be considered is selected from the identified frequencies used in the communication network. Clearly, in a communication network in which only a single frequency is used, this step is unnecessary.

In step 32, the border area to be considered is selected from identified border areas at the selected frequency in the communication network.

The border area selected will contain cells belonging to at least two different cell sets. In step 34, the number of cell identifier values required by each of the cell sets for cells in the border area is established.

In some embodiments, the number of cell identifier values required by each of the cell sets for cells in the border area may be established by executing an algorithm to determine this number. In other embodiments, the number of cell identifier values required may be established by receiving a message containing the required number, or by accessing a memory store in which the number of cell identifier values required is stored.

In step 36, one of the cell sets within the selected border area is selected.

In step 38, the available cell identifier values are obtained for the other cell set, in situations where the border area contains two cell sets, or each of the other cell sets, in situations where the border area contains three or more cell sets.

The available cell identifier values for each cell set are the cell identifier values that are available for cells within the border area and that do not conflict with other cells in the cell set. A cell identifier value can be said to conflict with other cells in the cell set if the cell identifier value is the same as the cell identifier value of a neighbouring cell or is the same as the cell identifier value of a cell that is neighbouring the neighbouring cell.

As will be known by a skilled person, there are a number of existing methods for determining cell identifier values that are available for cells, and so a detailed description of such methods will be omitted. The determination of which cell identifier values are available within a cell set in some embodiments of the present invention may be carried out by a self organising network function (SON) function for the cell set, which is responsible for ensuring that cell identifier values for cells of the cell set do not conflict.

In some embodiments all available cell identifier values for the different cell sets are obtained. However, in other embodiments the number of available cell identifier values obtained is greater than, or in some embodiments is equal to, the total number of cell identifier values required by the cell sets for cells in the border area.

In step 40, cell identifier values for a cell set are selected from suitable cell identifier values that are common to the respective sets of available cell identifier values for cell set(s) in the border area.

In some embodiments, suitable cell identifier values may be found by selecting cell identifier values that are common to the respective sets of available cell identifier values for the other cell sets in the border area. In some embodiments, the cell identifier values that are common to the respective sets of available cell identifier values for the other cell sets in the border area are determined from an intersect between the respective sets of cell identifier values for the other cell sets in the border area.

In some embodiments a required number of suitable cell identifier values needed for cells of that cell set in the border area are selected from the cell identifier values available for the other cell set, in the case of a border area having only a single other cell set, or are selected from cell identifier values that are common to the respective sets of available cell identifier values for the other cell sets in the border area, in the case of a border area having two or more other cell sets. So, for example, it may be that five potentially suitable cell identifier values are initially found, and only a required number of three suitable cell identifier values are selected from the five potentially suitable cell identifier values.

In some embodiments in which the suitable cell identifiers are selected from a larger number of potentially suitable cell identifier values, the cell identifier values that align best with existing cell identifier values in the cell set are selected as suitable cell identifier values in order to ensure minimum disruption to the cell identifiers used in the network.

If a potentially suitable cell identifier for cells of a cell set in the border area is already in use within the cell set in the border area, then in exemplary embodiments that cell identifier is chosen as a selected cell identifier. This selection ensures maximum alignment with existing cell identifiers and minimum disruption to the cell identifiers in use in the network. In other embodiments the cell identifier values that are considered to align best with existing cell identifier values may be those which are adjacent an existing cell identifier value, or that fall in between existing cell identifier values. The selection of these aligned cell identifiers from the larger number of potentially suitable cell identifier values may result in a tendency to maintain blocks of cell identifier values assigned to cell sets.

In step 42, the cell identifier values for a cell set are assigned to the cells in that cell set.

In step 44, the available cell identifier values for the cell set are updated, since cell identifier values that are available for cells of this cell set may have changed following the assignment of the cell identifier values to the cell set in step 42. These updated available cell identifier values for the cell may be used in selecting suitable cell identifier values for other cell sets in the border area.

In step 46, it is determined whether there are any further cell sets of the border area that have not been processed in accordance with steps 38-44. If there are still further cell sets in the border area, step 46-y, the method returns to step 36 to select a further next cell set in the border area for processing.

If all cell sets in a border area have been processed, step 46-n, it is determined in step 48 whether there are any more border areas to be processed. If there are still further border areas at the same frequency, step 48-y, the method returns to step 32 to select a further border area at that frequency for processing.

If all border area at that frequency have been processed, step 48-n, it is determined in step 50 whether there are any more frequencies to be processed. If there are still further frequencies, step 50-y, the method returns to step 30 to select a further frequency for processing. If all frequencies have been processed, step 50-n, the method shown in FIG. 3 finishes.

FIGS. 4-7 are schematic diagrams of a border area in a communication network illustrating the allocation of cell identifiers in accordance with an exemplary embodiment of the invention as described above with reference to FIG. 3 applied to a border area with three cell sets.

In FIGS. 4-7 the three cell sets have been denoted using respective operation and support system numbers OSS1, OSS2, and OSS3. A border area 54 has been identified between the three cell sets OSS1, OSS2 and OSS3, containing three cells from cell set OSS1, five cells from cell set OSS2 and one cell from cell set OSS3.

In FIGS. 4-7 the cells are shown using triangles and the figure shown within the triangles denotes the cell identifier value assigned to that cell. The arrows between the different cells within the border area 54 illustrate the cell neighbour relationships between the cells in the border area. The cells have not been numbered individually for the sake of clarity.

In this initial state in the exemplary embodiment, the cells have been allocated a cell identifier by a Self Organising Network (SON) application operating in their respective cell set. Two of the five cells in cell set OSS2 are able to share a cell identifier value of 1 because these cells are not neighbours of neighbour cells. Two of these cells are able to share a cell identifier value of 2, because these cells are not neighbours of neighbour cells.

In the exemplary communication network shown in FIGS. 4-7, seven cell identifier values 1-7 are available for use by the cells and so the set of possible cell identifier values for each cell set is {1, 2, 3, 4, 5, 6, 7}. As will be apparent to a skilled person, a physical network implementation will typically have many more possible cell identifier values. In an implementation in which the cell identifier values are physical cell identities (PCI) in a LTE communication network, 504 cell identifiers are provided to be used in the communication network.

In order to assign cell identifier values to cells in the border area shown in FIGS. 4-7, the method steps 36-44 are carried out for each cell set in turn. In the exemplary embodiment, the suitable cell identifier values for a cell set are selected from the cell identifier values that are common to the respective sets of available cell identifier values for cell sets in the border area.

Firstly in step 36 the first cell set OSS1 is selected.

In step 38, the available cell identifier values for the other cell sets in the border, namely cell sets OSS2 and OSS3, are obtained.

The cell identifier values that are available for cells within the border area and that do not conflict with other cells in cell set OSS2 is {4, 5, 6, 7} since cell identifiers 1, 2, 3 are already in use in cell set OSS2.

The set of cell identifier values for cell set OSS3 that are available for cells within the border area and that do not conflict with other cells in cell set OSS3 is {2, 3, 4, 5, 6, 7} since cell identifier 1 is already in use in cell set OSS3.

Next in step 40 the cell identifier values for cell set OSS1 can be selected from the set of available cell identifier values for cell sets OSS2 and OSS3 in border area in the exemplary embodiment.

In this exemplary embodiment, the cell identifier values are selected form values that are common to an intersect between the set of available cell identifier values for cell set OSS2 {4, 5, 6, 7} and the set of available cell identifier values for cell set OSS3 {2, 3, 4, 5, 6, 7} results in an intersect set of {4, 5, 6, 7} of potentially suitable cell identifier values for cell set OSS1.

Since three cell identifier values are required to be assigned to cell set OSS1, three cell identifier values must be selected from the intersect set {4, 5, 6, 7}.

In the exemplary embodiment, the alignment of the suitable cell identifier values in the intersect set with the existing cell identifier values is determined. However, in this example, there is no alignment of the intersect set {4, 5, 6, 7} with the cell identifier values {1, 2, 3} already in use.

Three cell identifier values {4, 5, 6} are selected for cell set OSS1.

Figure 5:
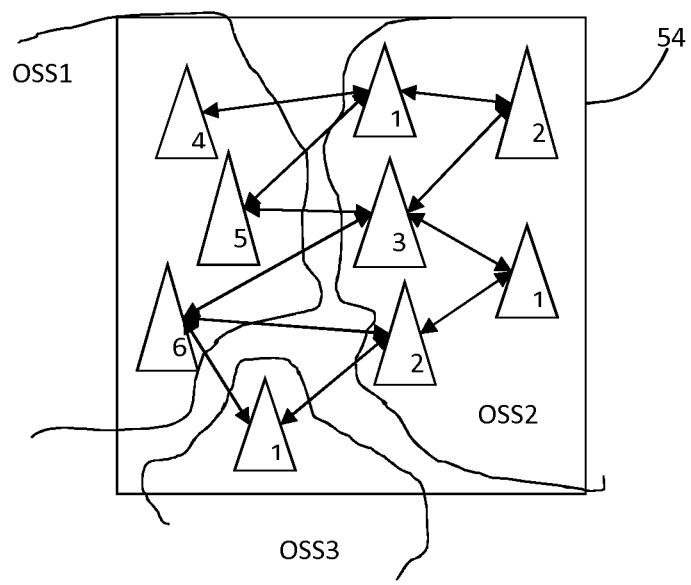

Next, in step 42 the selected cell identifier values {4, 5, 6} are assigned to the cell set OSS1. After the assignment of the selected cell identifier values to the cell set OSS1 the assigned cell identifier values for cells in the border area are as shown in FIG. 5.

Finally, in step 44, the available cell identifiers values for cell set OSS1 are updated. From a consideration of FIG. 5, it can be seen that the cell identifier values that are available for cells within the border area and that do not conflict with other cells in cell set OSS1 are {1, 2, 3, 7} since cell identifiers 4, 5, 6 are now in use in cell set OSS1.

Next, steps 36-44 are repeated for the next cell set OSS2.

In step 36 the second cell set OSS2 is selected.

In step 38, the available cell identifier values for the other cell sets in the border, namely cell sets OSS1 and OSS3, are obtained.

As established above, the cell identifier values that are now available for cells within the border area and that do not conflict with other cells in cell set OSS1 are {1, 2, 3, 7} since cell identifiers 4, 5, 6 are now in use in cell set OSS1.

The set of cell identifier values for cell set OSS3 that are available for cells within the border area and that do not conflict with other cells in cell set OSS3 is {2, 3, 4, 5, 6, 7} since cell identifier 1 is already in use in cell set OSS3.

Next in step 40 the cell identifier values for cell set OSS2 can be selected from the set of available cell identifier values for cell sets OSS1 and OSS3 in border area.

In this exemplary embodiment, an intersect between the set of available cell identifier values for cell set OSS1 {1, 2, 3, 7} and the set of available cell identifier values for cell set OSS3 {2, 3, 4, 5, 6, 7} results in an intersect set of {2, 3, 7} of potentially suitable cell identifier values for cell set OSS2.

Since three cell identifier values are required to be assigned to cell set OSS2, all three cell identifier values must be selected from the intersect set {2, 3, 7}.

Figure 6:
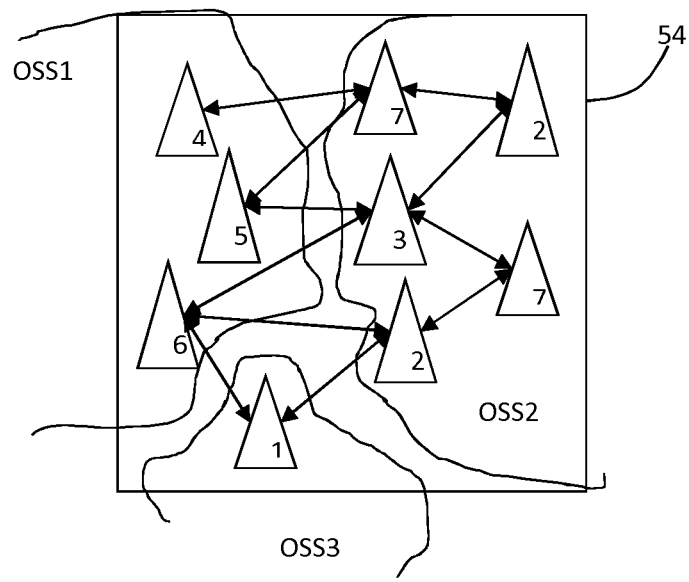

Next, in step 42 the selected cell identifier values {2, 3, 7} are assigned to the cell set OSS2. In this case, it can be seen that two of the cell identifier values assigned to cell set OSS2 in the border area, namely cell identifier values 2 and 3, are already in use for cells of cell set OSS2 in the border area. This assignment is maintained in the exemplary embodiment, so as to cause minimum disruption to the cell identifier values in the communication network, and the other cell identifier value {7} is assigned to the other cells in cell set OSS2 in the border area. As previously, two of the cells are able to share a cell identifier value of 7 because these cells are not neighbours of neighbour cells to each other. After the assignment of the selected cell identifier values to the cell set OSS2 the assigned cell identifier values for cells in the border area are as shown in FIG. 6.

Finally, in step 44, the available cell identifiers values for cell set OSS2 are updated. From a consideration of FIG. 6, it can be seen that the cell identifier values that are available for cells within the border area and that do not conflict with other cells in cell set OSS2 are {1, 4, 5, 6} since cell identifiers 2, 3, 7 are now in use in cell set OSS2.

Next, steps 36-44 are repeated for the third cell set OSS3.

In step 36 the third cell set OSS3 is selected.

In step 38, the available cell identifier values for the other cell sets in the border, namely cell sets OSS1 and OSS2, are obtained.

As established above, the cell identifier values that are now available for cells within the border area and that do not conflict with other cells in cell set OSS1 are {1, 2, 3, 7} since cell identifiers 4, 5, 6 are now in use in cell set OSS1.

As established above, the cell identifier values that are now available for cells within the border area and that do not conflict with other cells in cell set OSS2 are {1, 4, 5, 6} since cell identifier values 2, 3, 7 are now in use in cell set OSS2.

Next in step 40 the cell identifier values for cell set OSS3 can be selected from the set of available cell identifier values for cell sets OSS1 and OSS2 in border area.

In this exemplary embodiment, an intersect between the set of available cell identifier values for cell set OSS1 {1, 2, 3, 7} and the set of available cell identifier values for cell set OSS2 {1, 4, 5, 6} results in an intersect set of {1} of potentially suitable cell identifier values for cell set OSS3.

Since one cell identifier value is required to be assigned to cell set OSS3, this cell identifier value must be selected from the intersect set {1}.

Figure 7:
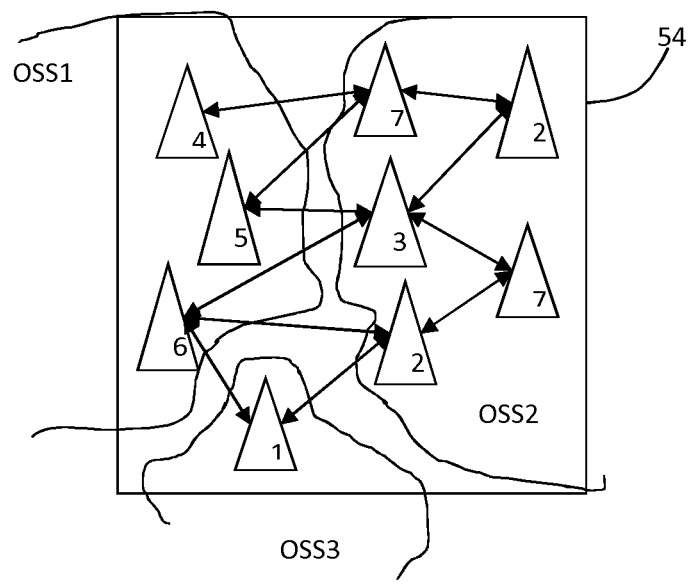

Next, in step 42 the selected cell identifier value {1} is assigned to the cell set OSS3. In this case, it can be seen that the cell identifier value assigned to cell set OSS3 in the border area, namely cell identifier value 1, is already in use for a cell of cell set OSS3 in the border area. This assignment is therefore maintained and so after the assignment of the selected cell identifier values to the cell set OSS3 the assigned cell identifier values for cells in the border area are as shown in FIG. 7.

Finally, in step 44, the available cell identifiers values for cell set OSS3 are updated. From a consideration of FIG. 7, it can be seen that the cell identifier values that are available for cells within the border area and that do not conflict with other cells in cell set OSS3 are {2, 3, 4, 5, 6, 7} since cell identifier 1 is in use in cell set OSS3.

The implementation of the method set out above in an exemplary communication system will now be described with reference to FIG. 8, which is a flow chart showing steps carried out in accordance with an embodiment of the invention.

Figure 8:
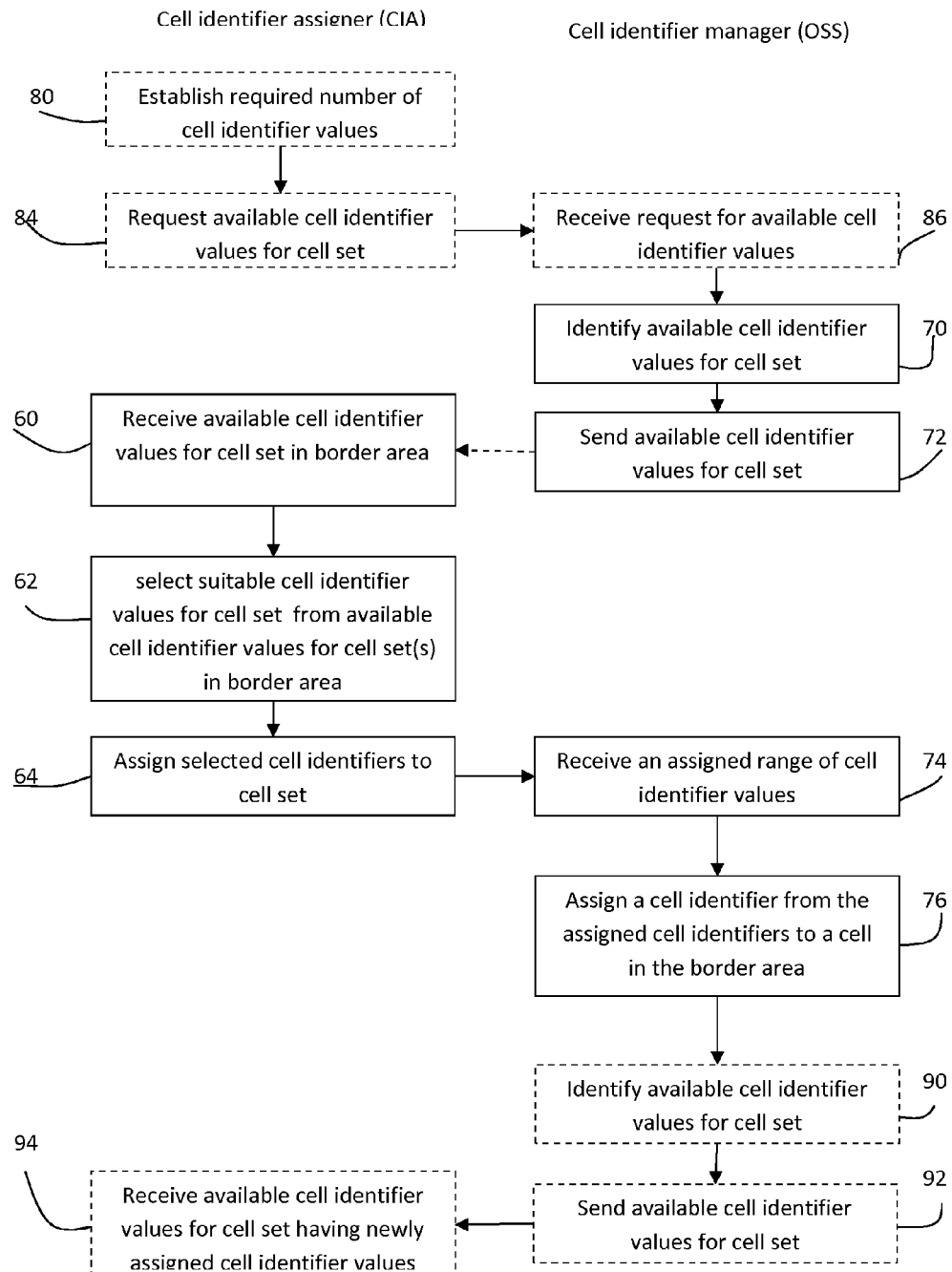
FIG. 8 is a flow chart showing steps carried out in accordance with an embodiment of the invention.

FIG. 8 illustrates more clearly the different steps carried out by different network elements during operation of an embodiment of the invention. The steps carried out by a first network element, for example the cell identifier assigner (CIA) 18 shown in FIG. 2, are shown on the left hand side of FIG. 8: the steps carried out by a second network element, for example the cell identifier managers (CIM) 20, 22 shown in FIG. 2, are shown on the right hand side of FIG. 8. As will be appreciated, especially from a consideration of FIG. 2, generally a communication network will have a single cell identifier assigner (CIA) 18 in communication with a number of cell identifier managers (CIM) 20, 22, one for each of the cell sets in the communication network.

In the exemplary embodiment, the cell identifier assigner (CIA) 18 is arranged to assign cell identifier values for cells of a cell set within a border area in a communication network that has at least two managed cell sets and where the border area contains cells from at least two cell sets.

In step 60 of FIG. 8, the cell identifier assigner 18 receives a set of cell identifier values that are available for cells within the border area and that do not conflict with other cells in the cell set.

In step 62, the cell identifier manager 18 selects for each cell set, suitable cell identifier values that are common to the respective sets of available cell identifier values for cell sets in the border area.

In step 64 the cell identifier manager 18 assigns a set of selected cell identifier values to the respective cell set by informing a respective cell identifier manager of the cell set of the selected cell identifier values.

The cell identifier managers (CIM) 20, 22 is arranged to manage the assignment of cell identifier values for cells in a cell set within a border area of a communication network, where the communication network has at least two managed cell sets and the border area contains cells from at least two cell sets.

In step 70 a cell identifier manager (CIM) 20, 22 identifies cell identifier values that are available for cells within the border area and that do not conflict with other cells in the cell set.

In step 72, the cell identifier manager (CIM) 20, 22 sends to the cell identifier assigner (CIA) 18 the set of cell identifier values that are available for cells within the border area and that do not conflict with other cells in the cell set.

In step 74 the cell identifier manager (CIM) 20, 22 receives from the cell identifier assigner (CIA) 18 a set of cell identifier values assigned for cells of the cell set in the border area.

In step 76 the cell identifier manager (CIM) 20, 22 assigns a cell identifier value from the set of assigned cell identifier values to a cell in the border area.

Steps of the method shown in FIG. 8 that are not necessary in every embodiment are shown in dashed lines in the drawings.

In some embodiments, in step 80 the cell identifier assigner (CIA) 18 establishes the required number of cell identifier values. In some embodiments, the cell identifier assigner (CIA) 18 may itself determine the required number of cell identifier values in step 80, for example by executing a routine/algorithm. In other embodiments, the cell identifier assigner (CIA) 18 might establish the required number of cell identifier values required for cell sets in the border area in step 80 by receiving information relating to the number of cell identifier values required for the cell set from the cell identifier manager (CIM) 20, 22 for that cell set.

As will be apparent to a skilled person, the required number of cell identifier values required for cells in a cell set in the border area may be used in some embodiments in order to ascertain the number of cell identifier values to select for that cell set in step 62, as described above. However, in other embodiments, the number of cell identifier values selected may be greater than the number of cell identifier values required at the time, so as to enable an allocation of "spare" cell identifier values to the cell set in the border area to enable changes in the number of cells of the cell set in the border area, for example, to be accommodated.

As described above in embodiments of the invention, the available cell identifier values for cell sets are received in step 60 and are used in step 62 to select new cell identifier values for a cell set.

In some embodiments in an initial step 84 the cell identifier assigner may initially or periodically request available cell identifier values for the cell set. This may be achieved, for example, by sending a suitable request message from the cell identifier assigner (CIA) 18 to the cell identifier managers of the cell sets.

In step 86 the cell identifier manager 20, 22 receives the request for available cell identifier values from the cell identifier assigner (CIA) 18, for example by receiving a request message from the cell identifier assigner (CIA) 18. In response to the receipt of the request for available cell identifier values, the cell identifier manager 20, 22 identifies the available cell identifier values for the cell set in step 70.

Additionally or alternatively in some embodiments, after the cell identifier manager 20, 22 receives the assigned range of cell identifier values in step 74 and assigns a cell identifier to a cell in the border area in step 76, the cell identifier manager 20, 22 automatically updates the available cell identifier values for the cell set.

Thus in a first step 90, the cell identifier manager 20, 22 identifies the available cell identifier values for the cell set, and in second step 92 the cell identifier manager 20, 22 sends the available cell identifier values for the cell set to the cell identifier assigner (CIA) 18. In step 94 the cell identifier assigner (CIA) 18 receives the updated available cell identifier values for the cell set having newly assigned cell identifier values. The steps 90, 92 and 94 correspond to steps 70, 72 and 60 discussed above.

As will be apparent to a skilled person, the method steps set out in FIG. 8 may be carried out by the cell identifier assigner 18 and the cell identifier managers for each of the cell sets during operation of an embodiment of the invention.

The creation of a model of the communication network and analysis of the network model to determine border areas within the communication network will now be described in more detail with reference to FIGS. 9-15.

Figure 9:
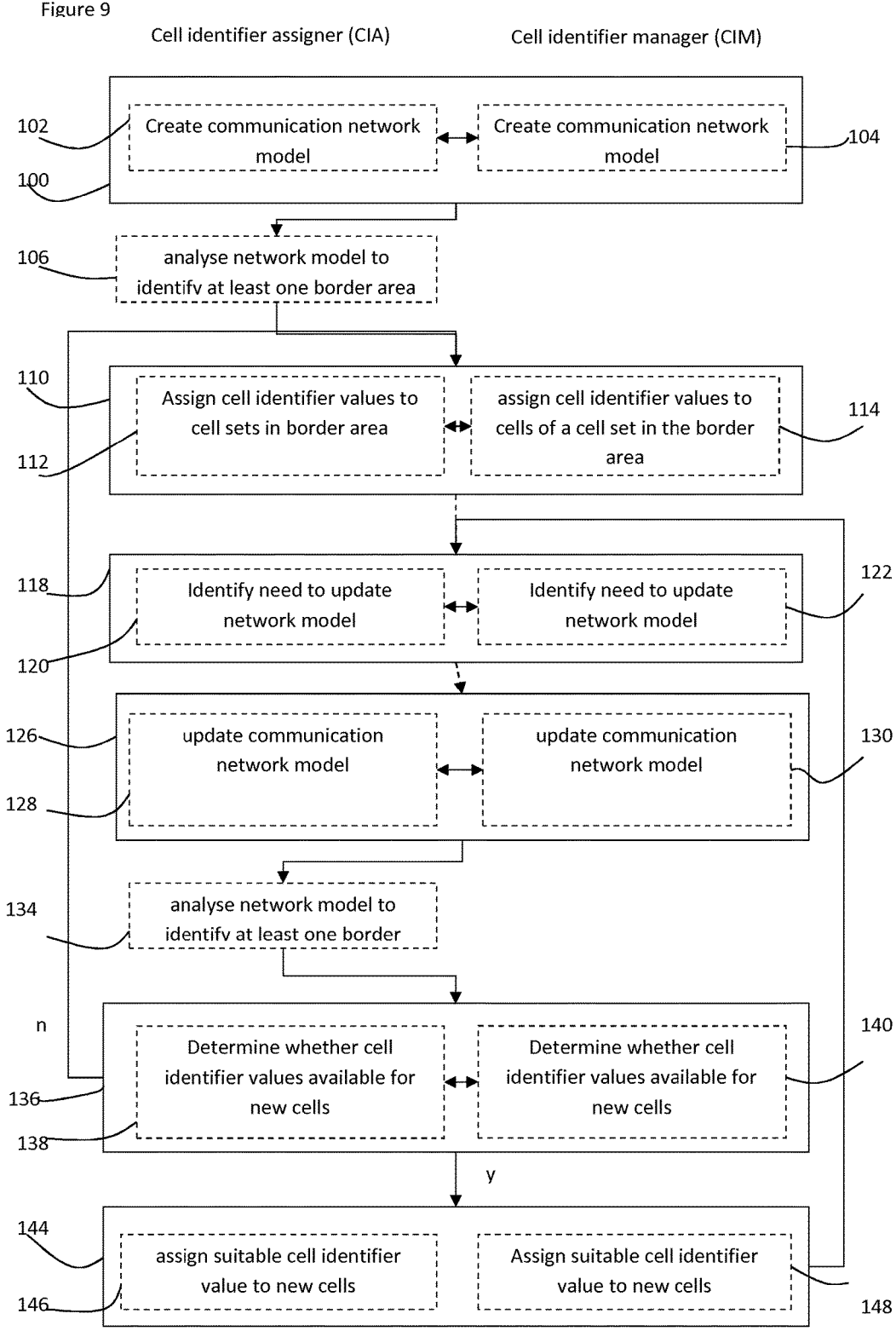
FIG. 9 is a flow chart showing steps of a method in accordance with one embodiment of the invention.

FIG. 9 is a flow chart showing steps of a method in accordance with one embodiment of the invention. Several of the steps of the method shown in solid lines may be carried out in different network elements, such as the cell identifier assigner (CIA) 18 or the cell identifier manager (CIM) 20, 22. In these cases, a dashed line method step box has been included within the box for the respective method step in FIG. 9.

In a first step 100, a communication network model is created. As shown in FIG. 9, this is achieved in the exemplary embodiment by method steps 102 carried out by the cell identifier assigner (CIA) 18 in co-operation with method steps 104 carried out by the cell identifier manager (CIM) 20, 22. These steps will be described below in more detail with reference to FIG. 10.

Once a communication network model has been established for the communication network, in step 106 the cell identifier assigner (CIA) 18 analyses the network model to identify at least one border area. Typically, the cell identifier assigner (CIA) 18 will identify a border area where cells of different cell sets are geographically adjacent and/or where cells of a cell set have a cell of a different cell set reported as a neighbour cell, as will be explained in more detail below with reference to FIG. 15. In embodiments of the invention, the cell identifier assigner (CIA) 18 distributes border area information to each cell identifier manager (CIM) 20, 22.

Once the border areas have been identified in step 106, in step 110 cell identifier values are assigned to cells of different cell sets in a border area. As shown in FIG. 9, this is achieved in the exemplary embodiment by method steps 112 carried out by the cell identifier assigner (CIA) 18 in co-operation with method steps 114 carried out by the cell identifier manager (CIM) 20, 22. The steps carried out by the cell identifier assigner (CIA) 18 and the cell identifier managers (CIM) 20, 22 for each of the cell sets in accordance with the exemplary embodiment have been previously discussed with reference to FIGS. 3 and 8.

Once the cell identifier values have been assigned in step 110 in FIG. 9, the network will operate satisfactorily with the assigned cell identifier values in the border area.

In some embodiments, a need to alter the network model may be identified at some later time, as shown by step 118. For example, if cells are added to or removed from a particular cell set it may be desirable to update the network model and re-assign cell identifier values for cells in cell sets in the border areas of the updated network model. Alternatively, in some embodiments, it may be useful to update the network model to maintain a correct relationship between the cell sets. In different embodiments, the step of identifying the need to update the network model, step 118, may be carried out in the cell identifier assigner (CIA) 18 in step 120 and/or in a cell identifier manager (CIM) 20, 22 in step 122.

In response to the identified need to update the network model in step 118, the communication network model is updated in step 126. In the exemplary embodiment the updating of the network model is carried out by method step 128 carried out by the cell identifier assigner (CIA) 18 in co-operation with method steps 130 carried out by cell identifier managers (CIM) 20, 22. In some embodiments, these steps 128 and 130 may be the same as or may be related to steps 102 and 104 described below in more detail with reference to FIG. 10.

Once the communication network model has been updated for the communication network, in step 134 the cell identifier assigner (CIA) 18 analyses the updated network model to identify at least one border area, or to identify updated border areas for example. In some embodiments, the cell identifier assigner (CIA) 18 will identify a border area where cells of different cell sets are geographically adjacent and/or where cells of a cell set have a cell of a different cell set reported as a neighbour cell, as will be explained in more detail below with reference to FIG. 15. In embodiments of the invention, the cell identifier assigner (CIA) 18 distributes border area information to each cell identifier manager (CIM) 20, 22.

In step 136 it is determined whether cell identifier values are available for the new cells in the border area. Again, steps may be carried out by the cell identifier assigner (CIA)

18 in step 138 and/or by the cell identifier manager (CIM) 20, 22 in step 140 in different embodiments of the invention.

As cells are added they may be able to use cell identifier values previously assigned to the cell set in the border area. If this is possible, in step 144 suitable cell identifier values are assigned to the new cells. Again, steps may be carried out by the cell identifier assigner (CIA) 18 in step 146 and/or by the cell identifier manager (CIM) 20, 22 in step 148 in different embodiments of the invention.

If it is not possible to use cell identifier values previously assigned to the cell set in the border area, then the method returns to step 110 to assign cell identifier values to cells in cell sets in the border area, as discussed previously.

Figure 10:
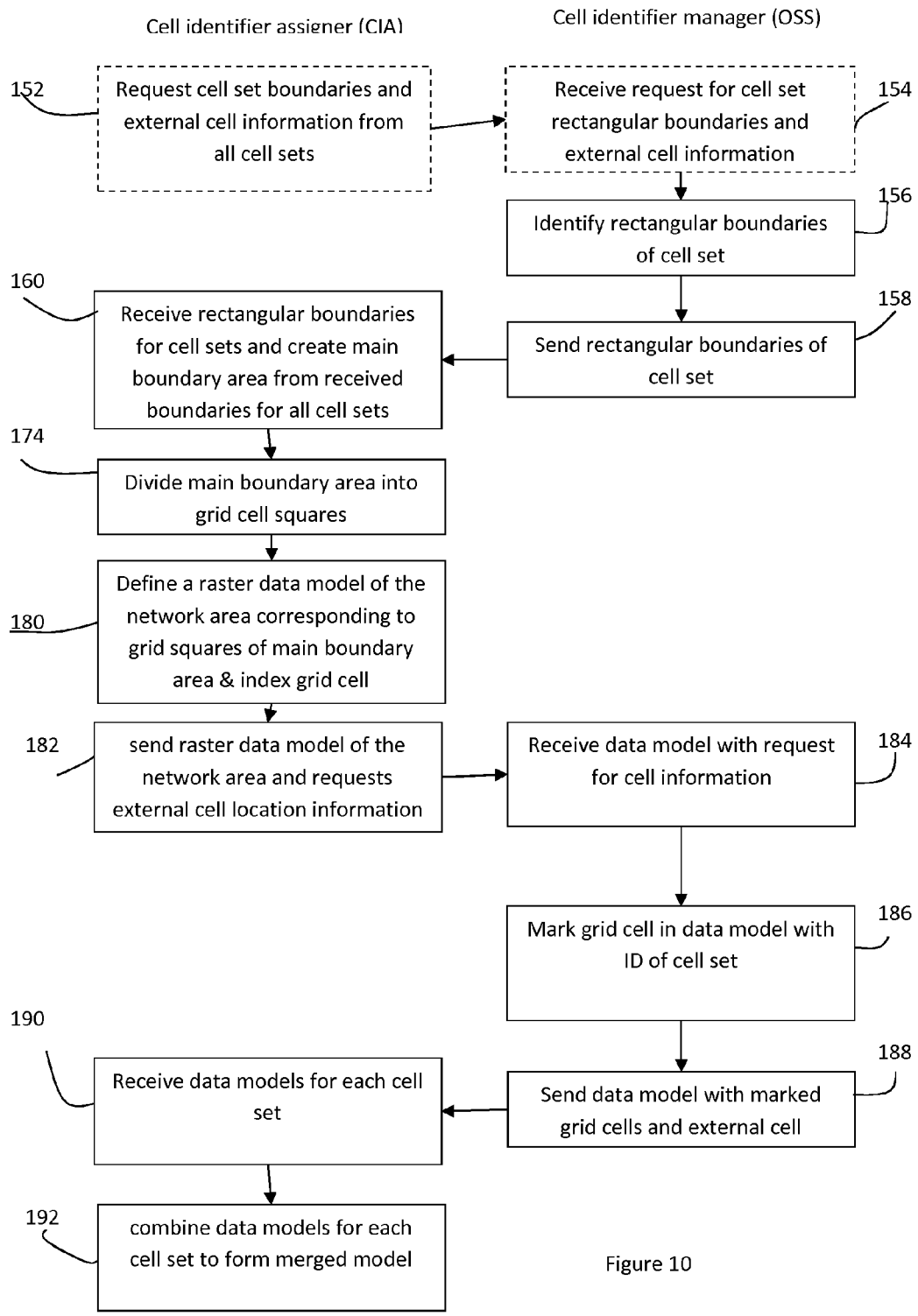
FIG. 10 is a flow chart showing steps of a method in accordance with one embodiment of the invention.

FIG. 10 is a flow chart showing steps of a method in accordance with one embodiment of the invention in which a communication network model may be created.

The exemplary method deals with non-overlapping cell sets where all cells are on the same frequency for simplicity of explanation.

In a first step 152, the cell identifier assigner (CIA) 18 of the exemplary embodiment sends a request for cell set boundaries and external cell information to cell identifier managers (CIM) 20, 22 for cell sets in the communication network. In the exemplary embodiment the cell identifier assigner (CIA) 18 broadcasts a request to all cell identifier managers (CIM) in the communication network for the following information:
  a. the boundary rectangular areas for the respective cell set; and
  b. a list of cells with a relationship with external cell(s) with the following information for each cell:
    i. position data for the cell (for example latitude & longitude)
    ii. an identifier, such as an evolved cell global identifier (ECGI), for each of the external cells to which the cell is related.

In step 154, a cell identifier manager (CIM) receives the request from the cell identifier assigner (CIA) 18 of the communication network.

In step 156 the cell identifier manager (CIM) determines the boundary rectangular area of the cell set. Determination of the boundary rectangular area is based on search of extreme points for west, north, east and south positions of cells in the cell set.

In step 158, the cell identifier manager (CIM) sends the information relating to rectangular boundaries of the cell set to cell identifier assigner (CIA) 18.

In step 160, the cell identifier assigner (CIA) 18 receives responses from the cell identifier manager (CIM) responsible for each of the cell set. The cell identifier assigner (CIA) 18 determines the main boundary rectangular area using the received data from the cell identifier manager (CIM) 20, 22. This area is determined by extreme points for west, north, east and south from the plurality of cell sets.

Figure 11A:
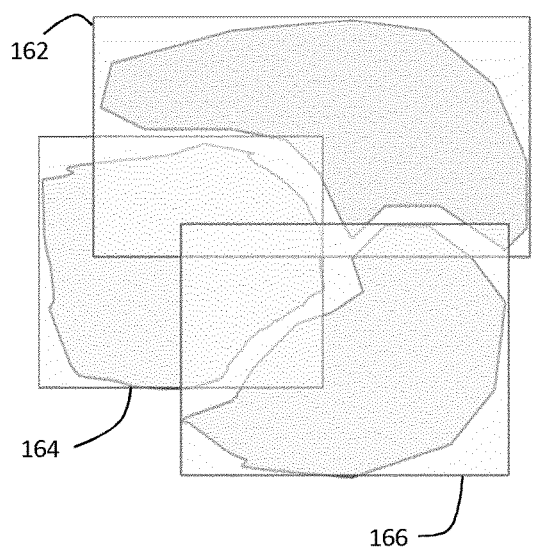
FIG. 11a is an exemplary schematic drawing of partial boundary areas for each of the managed cell sets in an exemplary communication network.

FIG. 11*a* is an exemplary schematic drawing of partial boundary areas 162, 164, 166 for respective managed cell sets in an exemplary communication network having three cell sets.

Figure 11B:
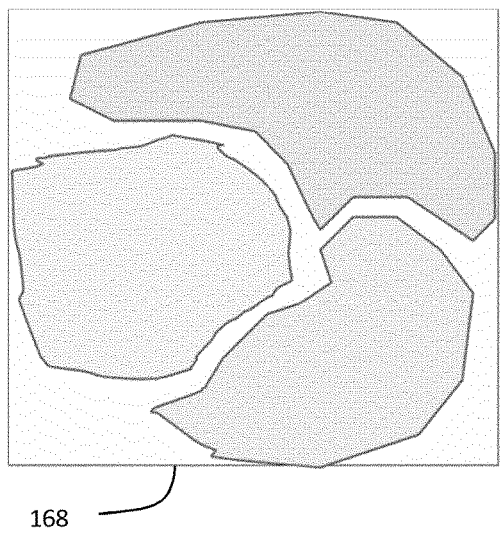
FIG. 11b is an exemplary schematic drawing of the boundary area for an exemplary communication network.

FIG. 11*b* is an exemplary schematic drawing of the main boundary area 168 derived from partial boundary areas 162, 164, 166 for the exemplary communication network having three cell sets.

Figure 12:
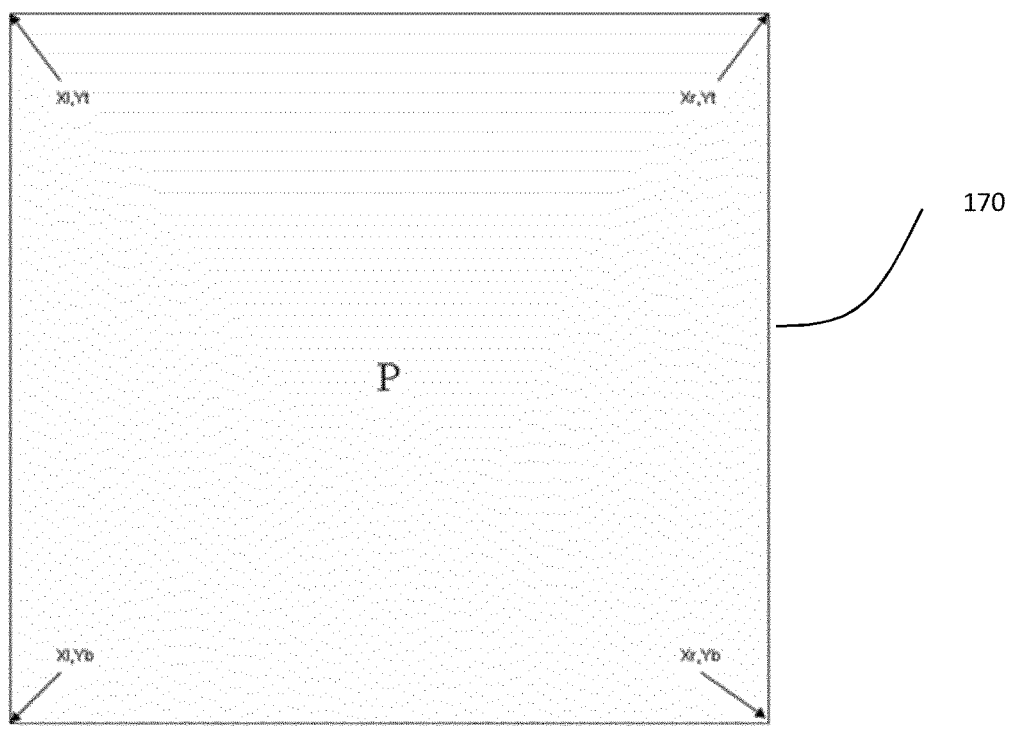
FIG. 12 illustrates the geographical extent of the communication network.

The geographical extent 170 of the communication network, as shown in FIG. 12, can be seen from the main boundary area 168 determined by the cell identifier assigner (CIA) 18.

Figure 13:
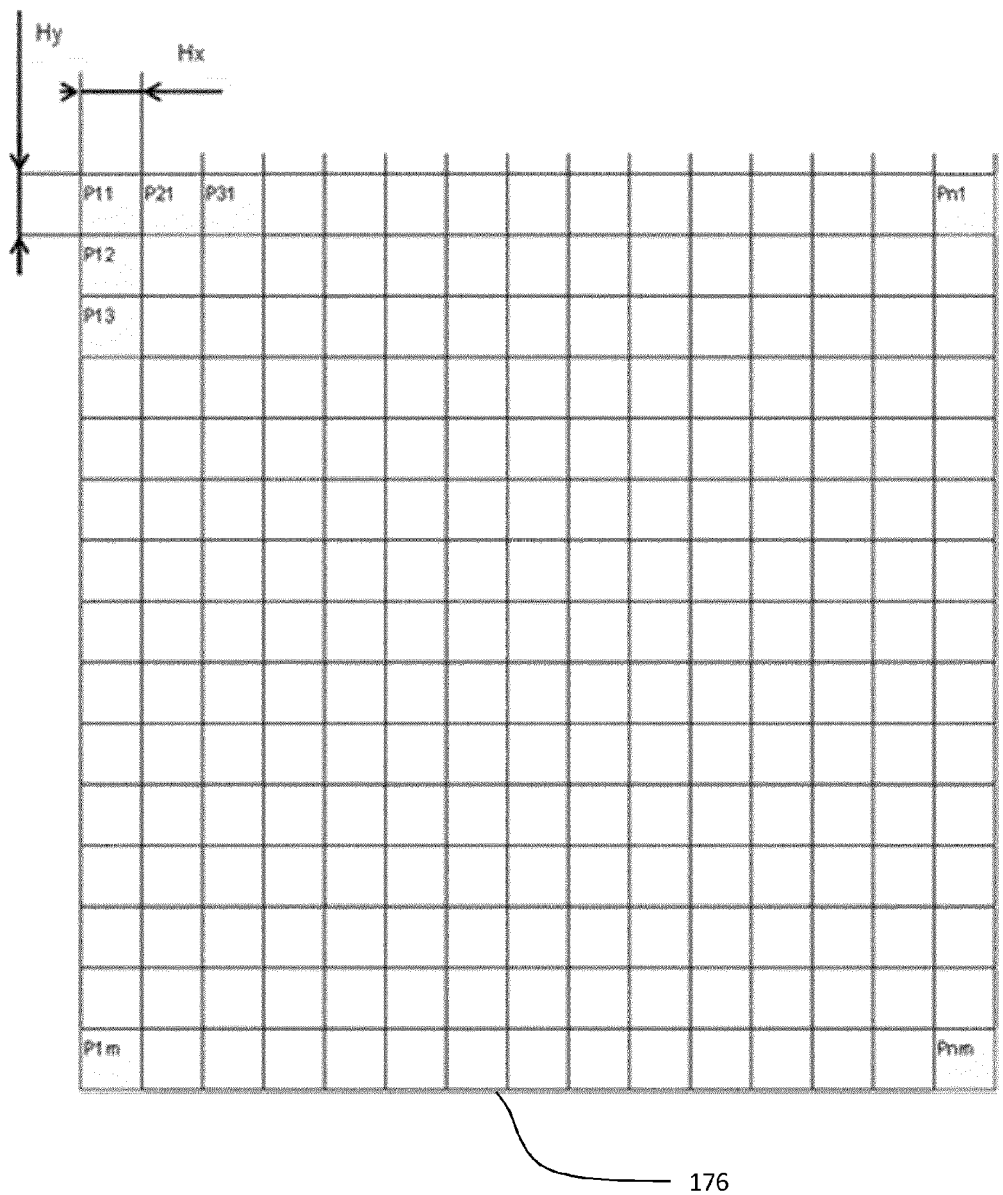
FIG. 13 shows a grid model of the geographical extent of the communication network.

In step 174 the cell identifier assigner (CIA) 18 divides the main boundary rectangular area established in step 160 into small squares so as to represent the area covered by the communication network as a grid model. Each square of the resulting grid is named as a grid cell. FIG. 13 shows a grid model 176 of the geographical extent of the communication network. As can be seen from FIG. 13, the x-axis distance Hx covered by one cell and the y-axis distance Hy covered by a cell can be selected by a skilled person, depending on how many grid cells are desired, the density of cells in the communication network, for example.

In step 180 the cell identifier assigner (CIA) 18 defines a raster data model of the network area corresponding to grid squares that keeps data about grid cells. Each grid cell is identified in raster data model by unique number called an index. Examples of indexes P11, P21, P31 etc for cells can be seen in grid model 176 shown in FIG. 13.

In step 182, cell identifier assigner (CIA) 18 broadcasts a request with raster data model to cell identifier managers (CIM) of cell sets in the communication network requests external cell location information, for example latitude & longitude information for cells that have been identified as external cells.

In step 184 a cell identifier manager of a cell set in the communication network receives the raster data model and the request for cell information.

In step 186, the cell identifier manager (CIM) marks grid cell in the data model with an identifier for the cell set, for example using the GPS position of cells to determine their location. In an exemplary embodiment, the cell identifier manager (CIM) marks the grid cells in the raster data model with the cell set identifier using GPS position (longitude/latitude) of cells and size of square in grid cell. In an exemplary embodiment, the cell identifier manager uses the evolved cell global identifier (ECGI) of the external cells to determine whether these external cells belong to the same cell set. If so, the cell identifier manager sends back to the latitude and longitude of these cells.

In step 188, the cell identifier manager (CIM) for a cell set in the communication network sends a response to the cell identifier assigner (CIA) for the network with marked grid cells in raster data model and also the requested cell information relating to that cell set.

In step 190, the cell identifier assigner (CIA) receives the data models for each cell set in the communication network from the respective cell identifier manager (CIM).

Figure 14:
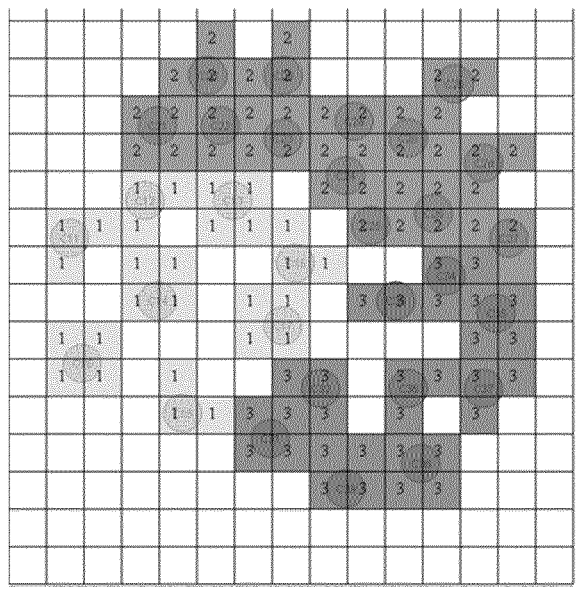
FIG. 14 shows an exemplary geographical model.

In step 192 the cell identifier assigner (CIA) 18 merges the raster data models received from each of the cell identifier manager (CIM) for each cell set in the communication network. As result the merged model contains identifiers corresponding to the different cell sets present in the communication network. FIG. 14 shows an exemplary merged model containing different cell set identifiers.

As described previously, the communication network model created in step 100 in FIG. 9, which has been described in more detail above with reference to FIG. 10, can be analysed to identify at least one border area therein, as described above with reference to steps 106 and 134 of FIG. 9.

In the exemplary embodiments cell identifier assigner (CIA) 18 may identify a border using:
  a determination that a grid cell contains more than one cell set identifier;
  a determination that grid cells containing different cell set identifiers are adjacent: information on relationships between cells belonging to different cell sets.

In some embodiments, borders are restricted to a certain number of grid cells. In such embodiments, there may be multiple border areas defined in a border between two or more cell sets. This may be useful for long borders and in situations where there are overlapping cell sets.

Figure 15:
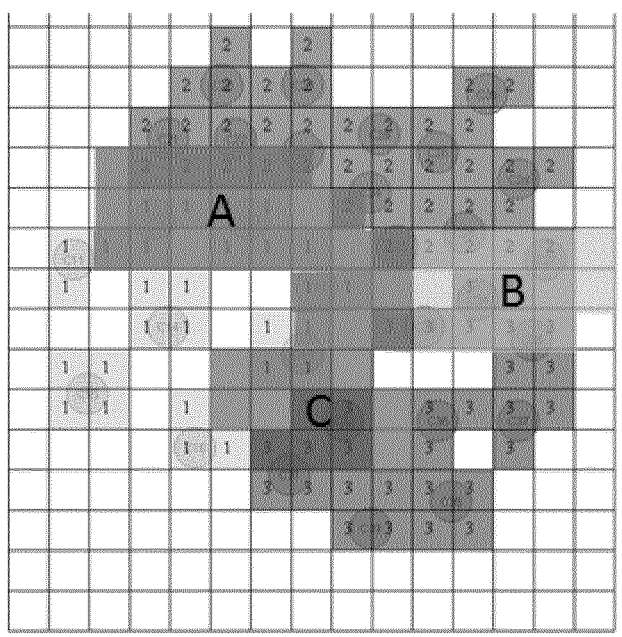
FIG. 15 shows an exemplary geographical model with marked border areas.

FIG. 15 shows the exemplary geographical model of FIG. 14 with marked border areas. In the exemplary graphical network model shown in FIG. 15 it can be seen that:

Border area A includes cells from cell sets OSS1, OSS2 & OSS3

Border area B includes cells from cell sets OSS1 & OSS2

Border area C includes cells from cell sets OSS1 & OSS3

The cell identifier assigner (CIA) 18 now distributes the border information to each cell identifier manager (CIM) 20, 22 as described above with reference to steps 106 and 134 of FIG. 9.

Figure 16:
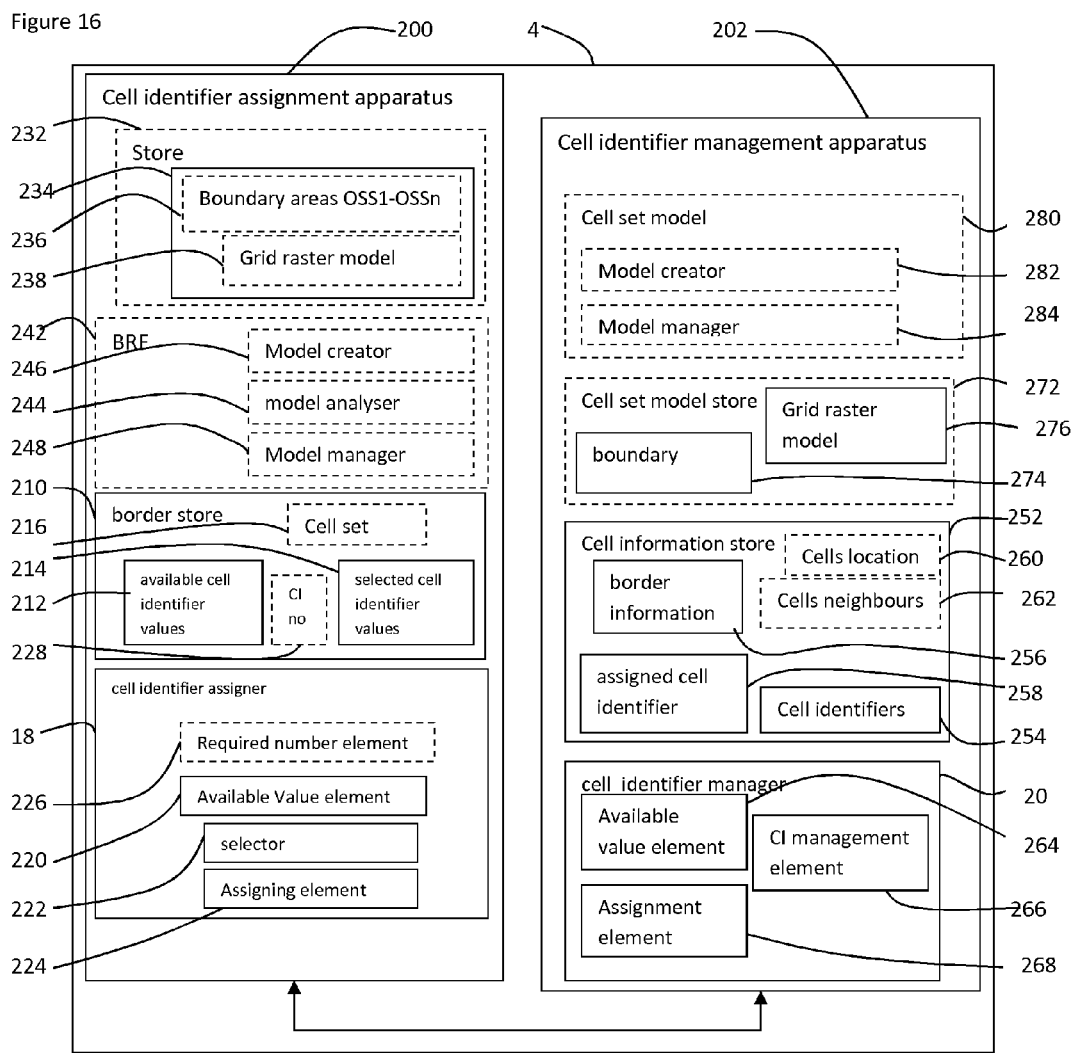
FIG. 16 is a schematic diagram of apparatus implementing the methods in accordance with embodiments of the invention.

FIG. 16 is a schematic diagram of apparatus implementing the methods in accordance with embodiments of the invention.

FIG. 16 shows a cell identifier assignment apparatus 200 and cell identifier assignment management apparatus 202. In the exemplary embodiment shown in FIG. 16, the cell identifier assignment apparatus 200 and the cell identifier assignment management apparatus 202 are both located within Operation Support System 4 described above with reference to FIG. 1. As will be clear from a consideration of FIGS. 1 and 2, cell identifier assignment apparatus 200 will also be coupled to other cell identifier assignment management apparatus (not shown) having the same configuration as cell identifier assignment management apparatus 202.

As will be apparent to a skilled person from a consideration of the preceding description of embodiments of the invention, the cell identifier assignment apparatus 200 is provided with a cell identifier assigner (CIA) 18 as described above, and cell identifier assignment management apparatus 202 is provided with cell identifier manager 20 for implementing the method of embodiments of the invention as described above.

A cell identifier assignment apparatus 200 assigns cell identifier values for cells of a cell set within a border area in a communication network with at least two managed cell sets where the border area contains cells from at least two cell sets.

The cell identifier assignment apparatus 200 has a border information store 210 for storing information relating to each border area in the communication network. The cell identifier assigner 18 is coupled to the border information store 210 (coupling not shown for clarity) to store information therein and to retrieve information therefrom.

The border information store 210 may be a dedicated store or in some embodiments may be physically part of a separate store, or may be a distributed store. The information may be stored in the border information store 210 in any way that is considered appropriate by a skilled person. In the exemplary embodiment, the border information is stored in the border information store 210 using one or more databases.

The border information store 210 stores a set of available cell identifier values 212 that are available for cells within the border area and that do not conflict with other cells in the cell set, for each cell set in the border area.

The border information store 210 stores a set of selected cell identifier values 214 for each cell set of the border area.

In some embodiments, the border information store 210 may also store cell set information 216 identifying the cell sets in each border area.

The cell identifier assigner 18 is provided with a number of different elements in the exemplary embodiment to perform the method of the invention. However, as will be apparent to a skilled person, the functionality may be provided using fewer or a greater number of elements in some embodiments. The functionality may be provided using a processor executing instructions causing the processor to perform the method set out above.

The cell identifier assigner 18 is provided with an available value element 220 that is coupled to communicate with a respective cell identifier manager 20, 22 for each cell set in a border area. The available value element 220 operates to obtain from the respective cell identifier manager 20, 22 the available cell identifier values that are available for cells within the border area and that do not conflict with other cells in the cell set. The available value element 220 is coupled to the border information store 210 to store the available cell identifier values 212 for each cell set in the border area.

The cell identifier assigner 18 is provided with a selector 222, coupled to the border information store 210 to access the available cell identifier values 212 for cell sets of the border area, the selector being arranged to select, for each cell set of the border area, suitable cell identifier values from the available cell identifier values 212 of the other cell set or other cell sets in the border area, and to store suitable cell identifier values as selected cell identifier values 214 in the border information store 210.

The cell identifier assigner 18 is provided with an assigning element 224, coupled with the border information store 210 to access the selected cell identifier values 214 for a cell set of the border area. The assigning element 224 is coupled with the respective cell identifier manager 20, 22 to send the selected cell identifier values 214 stored in the border information store 210 to assign the selected cell identifier values 214 to the respective cell set.

In some embodiments, the cell identifier assigner may also be provided with a required number element 226 for establishing, for each cell set, a required number of cell identifier values needed for cells of that cell set in the border area. The border information store 210 stores a required number of cell identifier values 228. The required number element 226 is coupled to the border information store 210 to store therein the required number of cell identifier values 228 needed for cells of that cell set in the border area.

In some embodiments, the available value element 220 is coupled (not shown for clarity) to access the border information store 210 to determine the required number of cell identifier values 228 needed for all cell sets in the border area. The available value element 220 is arranged to send to the respective cell identifier manager 20, 22 for each cell set in the border area a request for a number of available cell identifier values that is at least equal to the total number of cell identifier values needed for all cell sets in the border area.

In some embodiments the cell identifier assignment apparatus 200 is also provided with a network model store 232, for storing a geographic model 234 of the communication network containing information relating to cell positions and neighbouring cells for cells in a communication network. In some embodiments the network model store 232 may be implemented in the same memory as the border information store 210, as considered expedient by a skilled person.

In some embodiments the geographical model 232 stored in the network model store 234 may include a boundary area store 236, for storing rectangular boundary information for the cell sets in the communication network, as described above.

In some embodiments, the geographical model 232 stored in the network model store 234 may include a grid raster model 238 for storing cell location and external cell identities, as described above.

In some embodiments the cell identifier assignment apparatus 200 is also provided with a border recognition function 242. In some embodiments, the border recognition function 242 may be implemented as part of the cell identifier assigner 18. The functionality may be provided using a processor executing instructions causing the processor to perform the described actions.

In some embodiments, the border recognition function 242 is provided with an analyser 244 arranged to access the network model store 232. The analyser 242 is adapted to analyse the geographical model 232 of the communication network in the network model store 234, to identify at least one border area between cell sets in the communication network.

In some embodiments the border recognition function 242 also includes a network model creator function 246 that is coupled to the network model store 232 to store information therein and to retrieve information therefrom. The creator function 246 is arranged to communicate with cell identifier management apparatus of each of the cell sets within the communication network to create a geographic model 234 of the communication network from information gathered from the cell sets.

In some embodiments the border recognition function 242 also includes a network model manager 248 coupled to the network model store 232 to store information therein and to retrieve information therefrom. The network model manager 248 is arranged to communicate with the cell identifier management apparatus of each of the cell sets within the communication network to populate a geographic model 234 of the communication network from information gathered from the cell sets.

The cell identifier assignment management apparatus 202 is located within the operation support system 4 together with the provided with the cell identifier assignment apparatus 200 as described above.

A cell identifier assignment management apparatus 202 manages cell identifier values for cells in a cell set within a border area of a communication network with at least two managed cell sets where the border area contains cells from at least two cell sets.

The cell identifier assignment management apparatus 202 has a cell set information store 252 for storing information relating to the cell set. The cell identifier manager 20 is coupled to the cell set information store 252 (coupling not shown for clarity) to store information therein and to retrieve information therefrom.

The cell set information store 252 may be a dedicated store or in some embodiments may be physically part of a separate store, or may be a distributed store. The information may be stored in the cell set information store 252 in any way that is considered appropriate by a skilled person. In the exemplary embodiment, the cell set information is stored in the cell set information store 252 using one or more databases.

The cell set information store 252 stores cell identifier value information 254 for cells in the cell set.

The cell set information store 252 stores border information 256 relating to the cells in the border area.

The cell set information store 252 stores an assigned range of cell identifier values 258 for cells in a border area of the cell set.

In some embodiments the cell information store 252 stores cell location information 260 for cells in at least the border area of the cell set.

In some embodiments the cell information store 252 stores cell neighbour information 262 relating to neighbour cells for at least external cells of the cell set.

As will be apparent to a skilled person, in some embodiments, the cell location information 260 and the cell neighbour information 262 may equally be stored elsewhere in the operation support system as will be apparent to a skilled person.

The cell identifier manager 20 is provided with a number of different elements in the exemplary embodiment to perform the method of the invention. However, as will be apparent to a skilled person, the functionality may be provided using fewer or a greater number of elements in some embodiments. The functionality may be provided using a processor executing instructions causing the processor to perform the method set out above.

The cell identifier manager 20 is provided with an available identifier value element 264 for identifying, from the border information 256 and cell identifier value information 254 in the store 252, the available cell identifier values that can be used for cells of the cell set within the border area and do not conflict with cells in the cell set. The available identifier value element 264 is coupled to communicate with the cell identifier assigner 18 in the communication network to send the identified available cell identifier values to the cell identifier assigner 18.

The cell identifier manager 20 is provided with a cell identifier management element 266, which is coupled to the cell identifier assigner 18 to receive therefrom an assigned range of cell identifier values for cells of the cell set in the border area. The cell identifier manager 20 is coupled to the cell set information store 252 and is arranged to store the assigned set of cell identifier values 258 in the cell set information store 252.

The cell identifier manager 20 is provided with an assignment element 268 for assigning a cell identifier value from the assigned set of cell identifier values to a cell in the border area.

In some embodiments the cell identifier assignment management apparatus is provided with a a cell set model store 272, for storing a geographic model of the communication network containing information relating to cell positions and neighbouring cells for cells in a communication network. In some embodiments the cell set model store 272 may be implemented in the same memory as the cell set information store 252, as considered expedient by a skilled person.

In some embodiments the geographic model stored in the cell set model store 272 may include a boundary area store 274, for storing rectangular boundary information for the cell set, as described above.

In some embodiments, the geographic model stored in the cell set model store 272 may include a grid raster model 276 for storing cell location and external cell identities for cells in the cell set, as described above.

In some embodiments the cell identifier management apparatus 202 also comprises a cell set model function 280. In some embodiments, the cell set model function 280 may be implemented as part of the cell identifier manager 20. The functionality may be provided using a processor executing instructions causing the processor to perform the described actions.

In some embodiments the cell set model function 280 is provided with a cell set model creator 282 that is coupled to the cell set model store 272 to store information therein and to retrieve information therefrom. The cell set model creator 282 is arranged to communicate with a network model creator function 246 for the communication network to create a geographic model of the cell set in the cell set model store 272.

In some embodiments the cell set model function 280 is provided with a cell set model manager 284 coupled to the cell set model store 272 to store information therein and to retrieve information therefrom. The cell set model manager 284 is arranged to populate the geographic model in the cell set model store 272 with information relating to cell positions and neighbouring cells for cells in the cell set. The cell set model manager 284 is arranged to communicate with network model manager 248 for the communication network to send geographic model data for the cell set to the network model manager 248.

As will be appreciated by a skilled person from the previous description, each of the cell sets within the communication will be provided with a cell identifier management apparatus that correspond in arrangement and function with cell identifier management apparatus, and therefore have not been described further.

Figure 17:
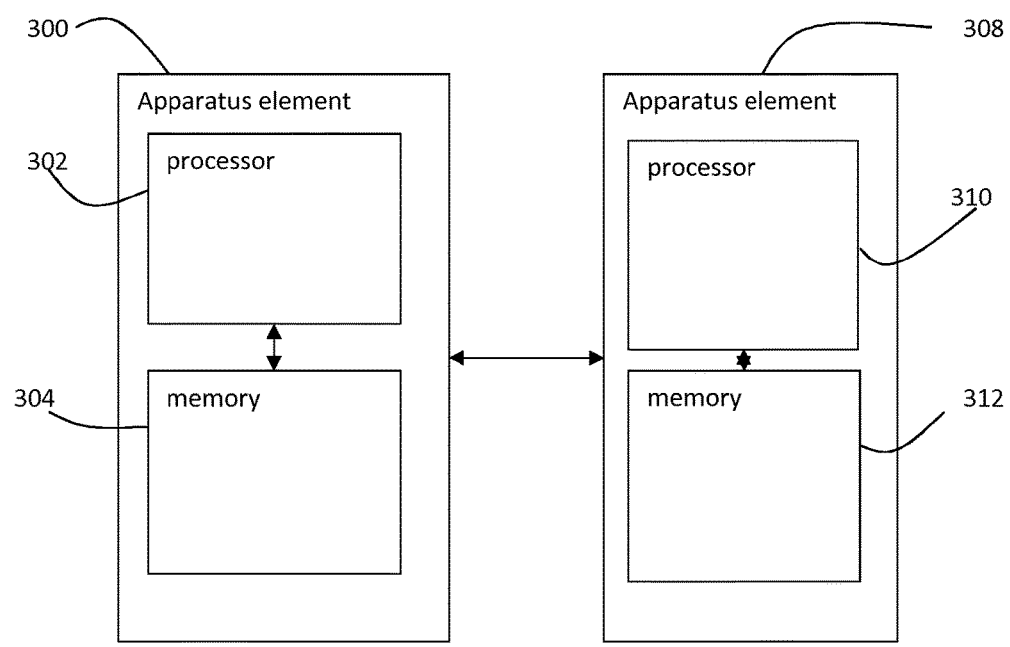
FIG. 17 illustrates exemplary apparatus elements in accordance with embodiments of the invention.

FIG. 17 illustrates exemplary apparatus elements in accordance with embodiments of the invention.

A first apparatus element 300 for assigning cell identifier values for cells of a cell set within a border area in a communication network, where the communication network has at least two managed cell sets and the border area contains cells from at least two cell sets, is shown. The first apparatus element 300 is provided with a processor 302 and a memory 304 containing instructions executable by the processor 302 whereby said apparatus element 300 is operative to: receive a set of cell identifier values that are available for cells within the border area and that do not conflict with other cells in the cell set for cell sets in the border area; for each cell set, select as suitable cell identifier values, cell identifier values that are common to the respective sets of available cell identifier values for cell sets in the border area; and assign a set of selected cell identifier values to the respective cell set by informing a respective cell identifier manager of the cell set of the selected cell identifier values.

A second apparatus element 308 for managing cell identifier values for cells in a cell set within a border area of a communication network, where the communication network has at least two managed cell sets and the border area contains cells from at least two cell sets, is shown. The second apparatus element 308 is provided with a processor 310 and a memory 312 containing instructions executable by the processor 310 whereby said apparatus element 308 is operative to: identify cell identifier values that are available for cells within the border area and that do not conflict with other cells in the cell set; send, to a cell identifier assigner, a set of available cell identifier values that are available for cells within the border area and that do not conflict with other cells in the cell set; receive, from the cell identifier assigner, a set of cell identifier values assigned for cells of the cell set in the border area; and assign a cell identifier value from the set of assigned cell identifier values to a cell in the border area.

The invention claimed is:

1. A method of assigning cell identifier values for cells within a border area in a communication network, the method comprising the steps of:

selecting an identified frequency for identifying the border area in the communication network;

selecting a first managed cell set in the border area, wherein the first managed cell set is one of at least two managed cell sets within the border area that comprises the first managed cell set and at least one other managed cell set, and wherein each of the at least two managed cell sets is managed by a different one of at least two Operation Support Systems;

obtaining a set of candidate cell identifier values of each respective one of the at least one other managed cell set, wherein for each obtained set of candidate cell identifier values, each of the candidate cell identifier values in the obtained set is a cell identifier value that is available for assignment to a cell associated with the respective one of the at least one other managed cell set without conflicting with any cell identifiers assigned to border area cells of the at least one other managed cell set, wherein a cell identifier value is in conflict with another cell identifier value if the cell identifier value is the same as the cell identifier value of a neighboring cell or is the same as the cell identifier value of a cell that is neighboring the neighboring cell;

identifying as suitable cell identifier values for the first managed cell set, cell identifier values that are common among the sets of candidate cell identifier values for the at least one other managed cell set;

assigning a set of the suitable cell identifier values to the first managed cell set by providing the set of suitable cell identifier values to the Operation Support System that manages the first managed cell set;

updating the set of candidate cell identifier values based on the assigned set of suitable cell identifier values; and selecting another one of the at least two managed cell sets within the border area and repeating the steps of the method until all of the managed cell sets within the border area have cell identifier values assigned.

2. The method as claimed in claim 1, further comprising the step of establishing for each managed cell set a required number of cell identifier values needed for cells of that managed cell set in the border area.

3. The method as claimed in claim 2, wherein in the step of identifying, at least the required number of cell identifier values needed for cells of the first managed cell set in the border area are identified as suitable cell identifier values.

4. The method as claimed in claim 1, wherein in the step of identifying, cell identifier values that are the same as existing cell identifier values in the first managed cell set are identified as suitable cell identifier values.

5. The method as claimed in claim 1, further comprising the step of sending to the respective Operation Support System for each managed cell set in the border area, a request for cell identifier values that are available for cells within the border area.

6. The method as claimed in claim 1, further comprising the step of receiving, in respect of a managed cell set having newly assigned cell identifier values, an updated set of cell identifier values that are available for cells within the border area for use in the step of selecting cell identifier values for other managed cell sets in the border area.

7. The method as claimed in claim 1, further comprising the step of analysing a geographical model of the communication network to identify at least one border area between managed cell sets in the communication network.

8. The method as claimed in claim 7, further comprising the step of creating a geographic model of the communication network by:

obtaining information from each managed cell set in the communication network relating to cell position and cell neighbour information; and creating a model of communication network by combining information about managed cell sets.

9. The method as claimed in claim 7 further including the steps of:

updating a geographic model of the communication network;

analysing the updated geographic model to identify border areas in the updated model; and assigning cell identifier values for cells of a managed cell set within at least one border area identified in the updated model.

10. The method as claimed in claim 1, wherein if a new cell is added to a managed cell set in the border area the method further comprises the step of:

determining whether one or more cell identifier values already evaluated as being suitable for cells in a managed cell set are available for use by the new cell of the cell set; and, in response to a positive determination, assigning the cell identifier value, or one of the cell identifier values, evaluated as being suitable to the new cell of the cell set.

11. An apparatus element, for assigning cell identifier values for cells within a border area in a communication network, the apparatus element comprising:

a processor; and a memory, said memory containing instructions executable by said processor whereby said apparatus element is operative to:

select an identified frequency for identifying the border area in the communication network;

select a first managed cell set in the border area, wherein the first managed cell set is one of at least two managed cell sets within the border area that comprises the first managed cell set and at least one other managed cell set, and wherein each of the at least two managed cell sets is managed by a different one of at least two Operation Support Systems;

obtain a set of candidate cell identifier values of each respective one of the at least one other managed cell set, wherein for each obtained set of candidate cell identifier values, each of the candidate cell identifier values in the obtained set is a cell identifier value that is available for assignment to a cell associated with the respective one of the at least one other managed cell set without conflicting with any cell identifiers assigned to border area cells of the at least one other managed cell set, wherein a cell identifier value is in conflict with another cell identifier value if the cell identifier value is the same as the cell identifier value of a neighboring cell or is the same as the cell identifier value of a cell that is neighboring the neighboring cell;

identify as suitable cell identifier values for the first managed cell set, cell identifier values that are common among the sets of candidate cell identifier values for the at least one other managed cell set;

assign a set of the suitable cell identifier values to the first managed cell set by providing the set of suitable cell identifier values to the Operation Support System that manages the first managed cell set;

update the set of candidate cell identifier values based on the assigned set of suitable cell identifier values; and select another one of the at least two managed cell sets within the border area and repeating the steps of the method until all of the managed cell sets within the border area have cell identifier values assigned.

12. The apparatus element as claimed in claim 11, wherein said memory contains instructions executable by said processor whereby said apparatus element is operative to establish, for each managed cell set a required number of cell identifier values needed for cells of that managed cell set in the border area.

13. The apparatus element as claimed in claim 11, wherein said memory contains instructions executable by said processor whereby said apparatus element is operative to create a geographic model of the communication network by:

obtaining information from each managed cell set in the communication n network relating to cell position and cell neighbour information; and creating a model of communication network by combining information about managed cell sets.

14. The apparatus element as claimed in claim 11, wherein said memory contains instructions executable by said processor whereby said apparatus element is operative to update a geographic model of the communication network by:

analysing the updated geographic model to identify border areas in the updated model; and assigning cell identifier values for cells of a managed cell set within at least one border area identified in the updated model.

15. An apparatus element of a first Operation Support System for managing cell identifier values for cells in a first managed cell set within a border area of a communication network, the apparatus element comprising:

a processor; and a memory, said memory containing instructions executable by said processor whereby said apparatus element is operative to:

select an identified frequency for identifying the border area in the communication network;

identify candidate cell identifier values in the first managed cell set that are available for assignment to a cell in the first managed cell set without conflicting with any cell identifiers assigned to border area cells of the first managed cell set, wherein a cell identifier value is in conflict with another cell identifier value if the cell identifier value is the same as the cell identifier value of a neighboring cell or is the same as the cell identifier value of a cell that is neighboring the neighboring cell;

send, to a cell identifier assigner, a set of the identified candidate cell identifier values;

receive, from the cell identifier assigner, a set of cell identifier values assigned for cells of the first managed cell set in the border area; and assign a cell identifier value from the set of assigned cell identifier values to a cell of the first managed cell set in the border area, wherein the communication network has at least two managed cell sets comprising the first managed cell set and at least one other managed cell set, and wherein each of the at least one other managed cell set is managed by a different one of at least one other Operation Support System that is different from the first Operation Support System, wherein the border area contains cells from the first managed cell set and from the at least one other managed cell set;

update the set of candidate cell identifier values based on the assigned set of suitable cell identifier values; and select another one of the at least two managed cell sets within the border area and repeating the steps of the method until all of the managed cell sets within the border area have cell identifier values assigned.

16. The apparatus element as claimed in claim 15, wherein said memory contains instructions executable by said processor whereby said apparatus element is operative to:

determine whether one or more cell identifier values already evaluated as being suitable for cells in a managed cell set are available for use by a new cell of the managed cell set; and, in response to a positive determination to assign a suitable cell identifier value to a new cell of the managed cell set.

* * * * *